(12) United States Patent
Jacobsen et al.

(10) Patent No.: US 7,779,863 B2
(45) Date of Patent: Aug. 24, 2010

(54) PRESSURE CONTROL VALVE HAVING AN ASYMMETRIC VALVING STRUCTURE

(75) Inventors: Stephen C. Jacobsen, Salt Lake City, UT (US); Shane Olsen, Centerville, UT (US); Michael Morrison, West Jordan, UT (US)

(73) Assignee: Raytheon Sarcos, LLC, Waltham, MA (US)

( * ) Notice: Subject to any disclaimer, the term of this patent is extended or adjusted under 35 U.S.C. 154(b) by 547 days.

(21) Appl. No.: 11/824,540

(22) Filed: Jun. 29, 2007

(65) Prior Publication Data

US 2009/0000674 A1    Jan. 1, 2009

(51) Int. Cl.
*F15B 13/04* (2006.01)

(52) U.S. Cl. .............. 137/596.15; 137/596.18; 91/433; 91/457

(58) Field of Classification Search ............ 137/596.15, 137/596.16, 596.17, 596.18, 596.14, 494, 137/505.14, 102, 116.3, 115.26; 91/433, 91/454, 457

See application file for complete search history.

(56) References Cited

U.S. PATENT DOCUMENTS

| | | | |
|---|---|---|---|
| 2,861,550 A | 11/1958 | Hanna et al. | |
| 3,566,919 A | 3/1971 | Vanderlaan | |
| 3,583,422 A | 6/1971 | Dach | |
| 3,593,522 A | 7/1971 | Angert | |
| 3,628,554 A | 12/1971 | Wilson | |
| 3,732,887 A | 5/1973 | Hayner | |
| 3,894,712 A | 7/1975 | Millar et al. | |
| 3,927,602 A | 12/1975 | Strauff | |
| 3,986,353 A | 10/1976 | Otsubo et al. | |
| 4,067,357 A | 1/1978 | Ruchser | |
| 4,069,843 A | 1/1978 | Chatterjea | |
| 4,131,130 A | 12/1978 | Ruby | |

(Continued)

FOREIGN PATENT DOCUMENTS

WO   WO 2008/106618   9/2008

*Primary Examiner*—John Rivell
*Assistant Examiner*—Craig M Schneider
(74) *Attorney, Agent, or Firm*—Thorpe North & Western LLP

(57) ABSTRACT

The present invention describes, generally, a method and system for controlling the dynamics of an actuatable load functioning or operable within a servo or servo-type system, wherein the dynamics of the load are controlled by way of a unique asymmetric pressure control valve configured to provide intrinsic pressure regulation. The asymmetric pressure control valve, which may be referred to as a dynamic pressure regulator because of its capabilities, utilizes different sized free floating spools that are physically independent of one another and freely supported in interior cavities of respective corresponding different sized valving components that make up the valve body to regulate the pressures acting within the overall system between the control or pilot pressure and the load or load pressure. The dual spools of the pressure control valve, although physically independent of one another, function in cooperation with one another in an attempt to maintain a state of equilibrium in the system, namely to keep pressure acting on or within the actuator (the load pressure), or the feedback pressure corresponding to the load pressure, the same as the control or pilot pressure. Moreover, pressure regulation and control is intrinsic to the asymmetric pressure control valve because of the configuration and function of the dual spools and the feedback system acting on the spools, thus eliminating the need for electronically or mechanically user controlled systems.

31 Claims, 12 Drawing Sheets

U.S. PATENT DOCUMENTS

| | | |
|---|---|---|
| 4,142,612 A | 3/1979 | Riddel |
| 4,150,543 A | 4/1979 | Helmer et al. |
| 4,203,465 A | 5/1980 | Rissi |
| 4,211,147 A | 7/1980 | Panissidi et al. |
| 4,266,466 A | 5/1981 | Ziems |
| 4,273,030 A | 6/1981 | Beeskow et al. |
| 4,348,159 A | 9/1982 | Acheson |
| 4,362,018 A | 12/1982 | Torii |
| 4,422,293 A | 12/1983 | Ewald |
| 4,478,250 A | 10/1984 | Lukasczyk et al. |
| 4,611,621 A | 9/1986 | Miyakawa et al. |
| 4,667,571 A | 5/1987 | Walters |
| 4,674,539 A | 6/1987 | Sloate |
| 4,714,459 A | 12/1987 | Hooven |
| 4,774,976 A | 10/1988 | Janecke et al. |
| 4,782,859 A | 11/1988 | Constantinian |
| 4,819,690 A | 4/1989 | Takahashi |
| 4,923,170 A | 5/1990 | Takaoka et al. |
| 4,941,508 A | 7/1990 | Hennessy et al. |
| 5,058,626 A | 10/1991 | Takaoka et al. |
| 5,123,450 A | 6/1992 | Wood et al. |
| 5,317,953 A | 6/1994 | Wentworth |
| 5,363,724 A | 11/1994 | Asahara et al. |
| 5,385,171 A | 1/1995 | Cleasby |
| 5,522,301 A | 6/1996 | Roth et al. |
| 5,538,480 A | 7/1996 | Torimoto |
| 5,644,967 A | 7/1997 | Joerg et al. |
| 5,832,882 A | 11/1998 | Matsuda |
| 5,924,958 A | 7/1999 | Tsuchiya et al. |
| 5,941,795 A | 8/1999 | Tsuchiya et al. |
| 6,021,864 A | 2/2000 | Sakata et al. |
| 6,269,733 B1 | 8/2001 | Reust |
| 6,463,959 B2 | 10/2002 | Kremer |
| 6,601,602 B2 | 8/2003 | Adler et al. |
| 7,284,471 B2 * | 10/2007 | Jacobsen et al. ............... 91/457 |
| 7,308,848 B2 * | 12/2007 | Jacobsen et al. ............... 91/457 |
| 7,509,905 B2 * | 3/2009 | Jacobsen et al. ............... 91/457 |
| 2006/0137519 A1 | 6/2006 | Jacobsen et al. |
| 2006/0144218 A1 | 7/2006 | Jacobsen et al. |
| 2008/0110329 A1 * | 5/2008 | Jacobsen et al. ............... 91/461 |

* cited by examiner

PRESSURE CONTROL VALVE HAVING AN ASYMMETRIC VALVING STRUCTURE

FIELD OF THE INVENTION

The present invention relates to servo or servo-type valves configured to control or regulate fluid flow and/or pressure within a servo or other control system, and more particularly to a pressure control valve configured to regulate fluid flow, and pressure, within an open or closed loop system.

BACKGROUND OF THE INVENTION AND RELATED ART

Fluid control or servo systems, such as hydraulic or pneumatic systems, are well known and operate on the simple principle of transferring force from an applied location to an output location by means of a fluid. In hydraulic systems, the transfer is typically accomplished by means of an actuator cylinder having a piston contained therein pushing a substantially incompressible fluid through a fluid line to another cylinder, also having a piston, at a different location. One tremendous advantage to transferring force through a hydraulic system is that the fluid line connecting the two cylinders can be any length and shape, and can wind or bend through all sorts of positions separating the two pistons. The fluid line can also split into multiple other fluid lines thus allowing a master piston to drive multiple slave pistons. Another advantage of hydraulic systems is that it is very easy to increase or decrease the applied force at the output location. This hydraulic force multiplication is accomplished by changing the size of one piston relative to the other.

In most hydraulic systems, cylinders and pistons are connected through valves to a pump supplying high-pressure hydraulic fluid functioning as the substantially incompressible fluid. Spool valves are the most commonly used valves in hydraulic systems and can apply pressure to either the front or back faces of the piston inside the hydraulic actuators. When one side the actuator cylinder is pressurized, the spool valve simultaneously opens a return line to the opposite side of the actuator, allowing the substantially incompressible hydraulic fluid on the opposing side of the piston to bleed back into a return reservoir. This relieves any internal pressure that would oppose the movement of the actuator, and limits the work required by the actuator to only that which is needed to drive the external load. As a result, spool valves are ideally suited to hydraulic systems because they allow efficient control of the flow rate to achieve hydraulic force.

Still, in spite of the advantages of spool valves in hydraulic systems, existing spool valves have certain design limitations. Traditional spool valves have been designed to be actuated by either mechanical levers, electrical servos or internal control pressures called pilot pressures, which are provided by way of a pilot valve. Spool valves are commonly mounted in a cylindrical sleeve or valve housing with fluid ports extending through the housing, which can be opened or closed for fluid communication with each other by positioning the lands and recesses of the spool in appropriate locations within the sleeve. The working pressure is varied by displacing the valve spool to open or close the valve allowing varying amounts of pressurized fluid to flow from the supply reservoir.

In the case of electrical actuation, the valve is controlled by an electrical input current from an electrical source. The current may be related to the pressure in the system in that the greater the current supplied, the wider the pressure or supply port is opened allowing pressurized fluid to flow into and through the valve with less restriction. When the load pressure in the actuator finally equals the supply pressure then flow stops. In other words, a given current controls the size of the openings in the pressure or return ports, which in turn controls the flow rate of fluid into or away from the hydraulic actuator. In order for the system to operate correctly, there must a be constant pressure differential across the spool valve. Otherwise, as the load pressure approaches the supply reservoir pressure the valve loses linear response and its operation becomes unstable. Consequently, spool valves are typically operated in systems where the pressure of the source (i.e. the supply reservoir) is very high compared to the range of opposing load pressures, and the flow versus input current at a given pressure is linear in the usable region.

What this means is that the system, and particularly the load, is always in a pressurized state and cannot be freely moved by an external force or under its own weight. As such, the load cannot easily be moved without actual active input in the form of input pressurized fluid. In other words, the actuator cannot be passively back driven. Such a configuration is extremely inefficient, as active input in the form of pressurized fluid is required to displace or actuate a load, even in response to kinetic energy that may result from the load under gravity or responding to momentum (e.g. while braking). The use of pressurized fluid creates a significant energy loss as new pressurized fluid must always be supplied in order to move and/or brake the load.

In addition to the current flow problems of traditional spool valves, classical hydraulic systems are problematic for several other reasons. First, complex controllers are needed to control the cycle times of valves and pistons. Second, cycle times for moving pistons are often long because large amounts of fluid are required to move output pistons. Third, the large quantity of fluid needed to drive output pistons requires constant pressurization of large reservoirs of fluid accumulators. Consequently, hydraulic machines typically require large amounts of hydraulic fluid for operation and therefore require large external reservoirs to hold the difference in the volume of fluid displaced by the two sides of any cylinder.

Classical spool valve devices are also limited in application because when a controlled flow is induced through a valve it generally translates directly into a controlled velocity of the actuator's piston. Consequently, complex system feedback devices must be used to convert the hydraulic energy from velocity inputs into a system based on load position. Introducing feed back control devices into the system limits its response to the bandwidth of the feedback loop and the responsiveness of the valves such that the time delays between the feedback devices and the valves make the system unstable when a resistive force is applied.

Still other problems exist with classical servo valves operating in classical servo systems. Due to the problems discussed above, these valves and systems are incapable of performing at high bandwidths without going unstable. In addition, significant amounts of energy may be lost due to leakage when not all of the valves in a multiple valve system are being used. Finally, the configuration of the spool can be limiting, with multiple lands and recesses formed in a single spool, and with the single spool functioning to open and close the pressure and return ports formed in the valve body.

As indicated, prior related fluid actuated or control systems, such as robotic and other hydraulic systems, typically require the use of active, pressurized fluid to actuate an actuator to drive or displace a load under both gravity and/or momentum. The use of active pressurized fluid to provide any movement of the actuators is recognized as a significant waste of energy and as being extremely inefficient. However, significant energy loss and reduced efficiency have given way to design factors or criteria focused on increased power, which have been perceived as being more important, or at least more desirable. Therefore, the loss of energy and reduced efficiency, in many cases, has not been the foremost or principal design priority. In other words, large and expensive systems have been created for the specific purpose of providing large or high power output although these systems are extremely inefficient.

SUMMARY OF THE INVENTION

In light of the problems and deficiencies inherent in the prior art, the present invention seeks to overcome these by providing a pressure control valve having an asymmetric valving configuration or structure. The pressure control valve comprises dual independent spools and a resultant intrinsic pressure feedback system, with the structure(s) housing the independent spools having different sized interiors or chambers, such that the dual independent spools are also of a different size. The asymmetric pressure control valve facilitates better functionality of a pilot valve in sourcing flow.

In accordance with the invention as embodied and broadly described herein, the present invention resides in an asymmetric pressure control valve for use within a servo or servo-type system configured to perform one or more active and/or passive functions, such as driving or actuating a load. The asymmetric pressure control valve is designed to regulate the flow of fluid, and more importantly the pressure, within the servo-type system, namely, between the control or pilot pressure and the load or load pressure (e.g., as induced by an actuator coupled to a load, wherein the actuator is configured to convert a received pressure to a force to drive the load, and vice versa in response to external forces acting on the load).

The asymmetric pressure control valve is unique in that it is capable of operating at high bandwidths without sacrificing stability in the system. The asymmetric pressure control valve is also unique in that it is capable of allowing the servo-type system to operate with a high degree of efficiency by functioning to allow the free-swing or dangle of the load without requiring power input to move or displace the load to achieve dangle movement. In other words, under certain and selective controlled conditions, the load may free swing or dangle in a bidirectional manner without the need to actively drive the actuator coupled to the load in either direction. In this mode, fluid is allowed to directly shunt back and forth between the actuator, the pressure control valve, and optionally the return reservoir through the return of the pressure control valve.

Instead of requiring a conventional feed back loop, the present invention asymmetric pressure control valve utilizes a pilot or control pressure that can be set and varied as needed. The pilot pressure functions to supply pressure to the control chamber in fluid contact with the independent spools. In the event the load pressure exceeds the pilot pressure, the return spool opens allowing fluid to flow through the return ports in an attempt to stabilize or equalize the pressure in the system. In the event the pilot pressure exceeds the load pressure, the pressure spool opens allowing pressurized fluid to flow through the pressure ports in an attempt to stabilize or equalize the pressure in the system. Thus, the asymmetric pressure control valve of the present invention could be described generally as a valve having dual independent floating spools that regulate respective pressure and return valves, wherein the spools act in cooperation with one another to keep pressure acting on or within the actuator (the load pressure) the same as the control or pilot pressure in the pressure control valve. Stated differently, when the load displaces in any one direction, thus changing the pressure in the load actuator or actuator, the return and pressure spools adjust to hold the pressure inside the load actuator the same as the pilot pressure inside the pressure control valve. Whenever the pressure in the load actuator exceeds the pilot or control pressure, the valve vents to purge pressure, and whenever the pressure in the load actuator is less than the pilot pressure, the valve takes pressurized fluid in and keeps pressure constant just like a regulator. Therefore, the present invention pressure control valve may be thought of as a dynamic pressure regulator. Indeed, the dual independent spools function like dynamically pre-defined fixed pressure regulators because the control or pilot pressure can be changed very quickly and remain stable when load pressures or feedback pressures exceed pilot or control pressures. This allows the gain in the system to be increased significantly without affecting the stability of the system.

Additionally, since the dual independent spool asymmetric pressure control valve is intrinsically a pressure source instead of a velocity source, when placed in servo or servo-type systems having an actuated load, the pressure in the system is converted to a force that drives the load. Consequently, when the current pressure in the system increases the resultant force within the load also increases.

Specifically, the present invention resides in an asymmetric pressure control valve for regulating pressure within a servo system comprising a valve body having an asymmetric configuration, such that a return valving component of the valve body comprises a greater size than a pressure valving component of the valve body, the valve body having return and pressure inlet and outlet ports formed therein for fluidly communicating with an interior cavity of the valve body; a return spool freely supported within an interior cavity of the return valving component of the valve body and configured to regulate fluid flow through the return inlet and outlet ports; and a pressure spool, independent of the return spool, and freely supported within an interior cavity of the pressure valving component of the valve body, the pressure spool configured to regulate fluid flow through the pressure inlet and outlet ports, the return spool being greater in size than the pressure spool and corresponding in size to the return valving component, the pressure spool corresponding in size to the pressure valving component.

The present invention also resides in an asymmetric pressure control valve for regulating pressure within a servo system comprising a valve body having an asymmetric configuration, and comprising first and second valving components, the first valving component comprising a greater size than the second valving component; various inlet and outlet ports formed in the valving components for fluidly communicating with an interior cavity of the valve body; a first spool freely supported within one of the first and second valving components of the valve body and configured to regulate fluid flow through select the inlet and outlet ports formed in the valve body; and a second spool, independent of the first spool, freely supported within the other of the first and second valving components of the valve body not supporting the first spool, the second spool configured to regulate fluid flow through select the inlet and outlet ports formed in the valve body, the first and second spools being different in size and each corresponding in size to their respective supportive valving components.

The present invention further resides in an asymmetric pressure control valve comprising a floating return spool configured to freely move within a return valving component of a valve body; a floating pressure spool configured to freely move within a pressure valving component of the valve body, the return spool having a greater size than the pressure spool, and the return valving component having a greater size than the pressure valving component; the floating return and pressure spools structurally independent of one another and the valve body, the pressure control valve configured to regulate pressure via an intrinsic feedback system configured to intrinsically and systematically displace at least one of the return and pressure spools in response to a pressure differential existing between a pilot pressure and a feedback pressure acting on opposing sides of each of the return and pressure spools, in an attempt to dissipate the pressure differential and equalize the pilot pressure and the feedback pressure.

The present invention still further resides in an asymmetric pressure control valve comprising a valve body having pressure and return inlet and outlet ports formed therein, the valve body comprising a return valving component having an interior cavity, and a pressure valving component having an interior cavity, the interior cavity of the return valving component having a larger cross-sectional area than the interior cavity of the pressure valving component; a return spool disposed within the interior cavity of the return valving component and configured to regulate fluid flow through the return inlet and outlet ports, the return spool having a pilot pressure side and a load feedback pressure side; a pressure spool disposed within the interior cavity of the pressure valving component opposite and independent of the return spool, the return spool comprising a larger radial size than the pressure spool, the pressure spool configured to regulate fluid flow through the pressure inlet and outlet ports, the pressure spool also having a pilot pressure side and a load feedback pressure side; and limiting means located within the return and pressure valving components configured to establish limiting positions of the return and pressure spools, the return and pressure spools capable of being displaced to intrinsically and systematically open and close the return and pressure inlet and outlet ports in response to a pressure differential created between a pilot pressure and a feedback pressure concurrently acting on the pilot pressure and load pressure sides, respectively, of the return and pressure spools for the purpose of dissipating the pressure differential.

The present invention still further resides in an asymmetric pressure control valve, comprising a valve body having pressure inlet and outlet ports and return inlet and outlet ports formed therein, the valve body comprising a return valving component having an interior cavity, and a pressure valving component having an interior cavity, the interior cavity of the return valving component having a greater cross-sectional area than the interior cavity of the pressure valving component; a return spool configured to regulate fluid flow through the return inlet and outlet ports, the return spool having a pilot pressure side and a feedback pressure side; a pressure spool independent of the return spool, and comprising a smaller cross-sectional area than the return spool, which the smaller cross-sectional area corresponds to the pressure valving component, the pressure spool configured to regulate fluid flow through the pressure inlet and outlet ports, the pressure spool also having a pilot pressure side and a load feedback pressure side; a pilot pressure chamber confined between and defined by the pilot pressure sides of the return and pressure spools, the pilot pressure chamber in fluid communication with a pilot pressure source configured to provide a variable pilot pressure within the pilot pressure chamber to act on the pilot pressure sides of the return and pressure spools; a feedback port formed in the valve body and in fluid communication with the feedback pressure side of the return spool; a feedback port formed in the valve body and in fluid communication with the feedback pressure side of the pressure spool; a main fluid line in fluid communication with the return and pressure outlet ports and the feedback ports; a load feed line in fluid communication with the main fluid line and a load energy conversion system, the load energy conversion system comprising a variable load pressure therein configured to exert a variable feedback pressure on the feedback pressure sides of the return and pressure spools, wherein the feedback pressure may be different than the pilot pressure, thus creating a pressure differential causing the return and pressure spools to displace to selectively open the pressure and return inlet and outlet ports to dissipate the pressure differential for the purpose of balancing the pilot and load pressures; a return spool stop coupled to the return valving component of the valve body and positioned on the feedback pressure side of the return spool, the return spool stop configured to limit the displacement position of the return spool so that the return inlet and outlet ports are at least partially closed when the pilot pressure is greater than the feedback pressure; and a pressure spool stop coupled to the pressure valving component of the valve body and positioned on the pilot pressure side of the pressure spool, the pressure spool stop configured to limit the displacement position of the pressure spool so that the pressure inlet and outlet ports are at least partially closed when the pilot pressure is less than the feedback pressure.

The present invention still further resides in a method for regulating and controlling pressure within a servo-type system, the method comprising providing an asymmetric pressure control valve comprising an asymmetric valve body, wherein a return valving component is sized differently than a pressure valving component, the pressure control valve also comprising differently sized independent return and pressure spools freely situated in the valve body, the return and pressure spools each comprising a pilot pressure side and a feedback pressure side and each configured to regulate fluid flow through return and pressure inlet and outlet ports formed in the valve body, respectively; supplying a pilot pressure to the respective pilot pressure sides of the return and pressure spools; supplying a feedback pressure to the respective feedback pressure sides of the return and pressure spools; and inducing a pressure differential across the pilot pressure and feedback pressure sides of the return and pressure spools, thus causing at least one of the return and pressure spools to displace in response to the pressure differential in an attempt to dissipate the pressure differential and equalize the pilot pressure and the feedback pressure.

The present invention still further resides in a method for introducing passive actuation within a servo or servo-type system comprising providing a load actuator coupled to a load and configured to convert back and forth a load pressure and a force; providing an asymmetric pressure control valve in fluid communication with the load actuator, the pressure control valve comprising an asymmetric valve body having different sized valving components, and different sized independent return and pressure spools freely situated in the different sized valving components, respectively, the return and pressure spools each comprising a pilot pressure side and a feedback side and each configured to regulate fluid flow through return and pressure inlet and outlet ports formed in the valve body, respectively, in accordance with an intrinsic mechanical feedback system; supplying a pilot pressure to the respective pilot pressure sides of the return and pressure spools; supplying a feedback pressure to the respective feedback sides of the return and pressure spools, the feedback pressure corresponding to the load pressure provided by the load actuator; and manipulating the pilot pressure to be below the feedback pressure to cause the pressure control valve to enter a passive actuation or slosh mode, wherein the pressure spool is closed and the return spool is open, thus allowing fluid to directly shunt back and forth between the pressure control valve and the load actuator through the return inlet and outlet ports.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 6-B illustrates a cut-away view of another exemplary limiting means in the form of a single nub protruding from the interior wall portion of the valve body;

FIG. 6-C illustrates a cut-away view of another exemplary limiting means in the form an annular ring protruding from the interior wall portion of the valve body;

DETAILED DESCRIPTION OF EXEMPLARY EMBODIMENTS

Figure 1:
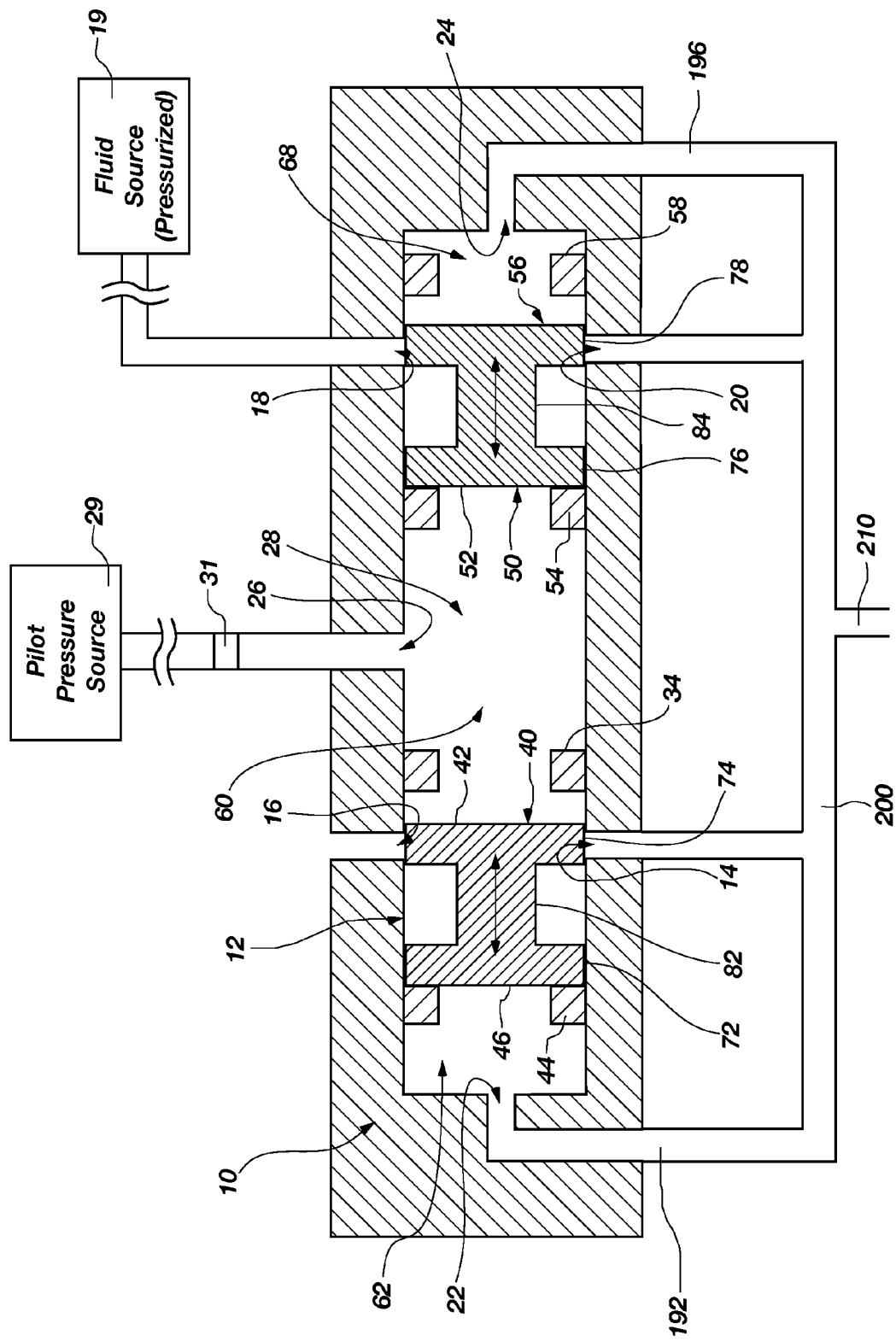
FIG. 1 illustrates a cut-away, cross-sectional view of one exemplary embodiment of a symmetrical dual independent spool pressure control valve, wherein the pressure control valve is in a state of equilibrium.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Preliminarily, the terms "bilateral control" or "bilateral pressure regulation," as used herein, shall be understood to mean the ability of a single pressure control valve to effectuate two-way pressure regulation, meaning that the pressure control valve is able to regulate and control the pressures acting within the actuator on both sides of the actuator piston to displace the piston and therefore drive the load bi-directionally.

The term "pressure differential," and similar terminology, as used herein, shall be understood to mean or shall refer to a state of non-equilibrium existing within the system between the pilot pressure and the load pressure. In some embodiments, a "pressure differential" may mean a simple difference in pressure magnitudes between the load pressure and the pilot pressure. In other embodiments, namely those utilizing area reduction for load/force translation or multiplication, a "pressure differential" may mean a non-proportional difference in pressure existing between the load pressure and the pilot pressure, taking into account the different areas of the valve body, the actuator, and any hydraulic multiplication.

The term "load pressure," as used herein, shall be understood to mean the pressure acting within the load actuator as induced or applied by a load, minus the friction or other losses internal to the actuator mechanism itself. The load pressure directly influences and dictates the feedback pressure.

The term "feedback pressure," as used herein, shall be understood to mean the pressure acting upon the feedback pressure sides of the independent return and pressure spools as received or dictated by the load pressure after all area reductions/increases and fluid pressure multiplications/divisions have occurred, if any. The feedback pressure may, in some cases, equal the load pressure.

The term "actuator" or "load actuator," as used herein, shall be understood to mean any system or device capable of converting fluid energy into usable energy, such as mechanical energy. A typical example of a load actuator is a hydraulic actuator coupled to a load, wherein the hydraulic actuator receives pressurized hydraulic fluid from a hydraulic fluid source and converts this into mechanical work or a force sufficient to drive the load.

The term "dangle," as used herein, shall be understood to mean the free swing of the load in either direction in response to a non-actuated force acting on the load (e.g., one utilizing kinetic energy generated from an external force, momentum, etc.), wherein the movement of the load is achieved without providing active input from the fluid control system to move the load in either direction (which condition may be referred to as passive passivity). The ability to dangle or free-swing is made possible by the various present invention pressure control valves operating in a "slosh mode."

The term "slosh" or "slosh mode," as used herein, shall be understood to mean the passive valving state of the antagonistic pressure control valves, wherein the pilot or control pressure in each valve is maintained below both the load or feedback pressure and the return reservoir pressure, thus causing the return spools in each valve to displace to and be maintained in the open position. With the pilot pressure below both the load pressure or the feedback pressure and the return reservoir pressure, and the return spools in their open positions, local fluid is able to shunt or slosh back and forth between the load actuators through the open return ports of the pressure control valves in response to movement of the load, and thus the actuator. The shunting of local fluid is done with little or no resistance, thus improving the impedance of the system. In addition, as mentioned, only local fluid shunts back and forth, which means that the system only uses the fluid present in the actuators, the pressure control valves, and the various fluid lines connecting them rather than actively requiring pressurized fluid to enable actuation. Fluid in the pressure supply is neither used nor diluted, thus greatly improving the efficiency of the system.

In the slosh mode, no active input from pressurized fluid (e.g., power) is necessary to influence the dynamics of the actuators and the load in either direction as in prior related servo and fluid control systems. Indeed, prior related systems are only somewhat passive, meaning that some degree of active power or pressurized fluid is still needed to actuate the load in one or both directions. This prior art condition may be termed as "active passivity" because, although the system appears passive, it really is active, even if only slightly.

On the other hand, present invention pressure control valve is capable of passive passivity. "Passive passivity" may be referred to as the ability of the present invention pressure control valve, as contained within a servo or servo-type system, to allow the load to move or "dangle" in response to imposed external or internal conditions without any active input or influence from the system other than the operation of the pilot pressure or servo motor which controls the pilot pressure. More specifically, passive passivity does not require any pressurized fluid from the supply reservoir to permit movement or actuation of the actuators or the load.

The term "output pressure," as used herein, shall be understood to mean the pressure output from a pressure control valve operable with an actuator, wherein the output pressure is supplied to the actuator and converted into an actuating force within the actuator.

The present invention describes, generally, a method and system for controlling the dynamics of an actuatable load functioning or operable within a servo or servo-type system, wherein the dynamics of the load are controlled by way of unique pressure control valve (hereinafter "PCV") configured to provide intrinsic pressure regulation. Unlike conventional flow control valves, the present invention PCV provides better dynamic performance by being able to provide sufficiently high gain, and therefore achieve soft or better performance, without going unstable. Indeed, the present invention PCV provides force control rather than velocity control, such as in conventional flow control valves.

The PCV, which may be referred to as a dynamic pressure regulator because of its capabilities, is unique in that it utilizes dual spools that are physically independent of one another and freely supported in the valve body to regulate the pressures acting within the overall system between the control or pilot pressure and the load or load pressure. The dual spools of the PCV, although physically independent of one another, function in cooperation with one another in an attempt to maintain a state of equilibrium in the system, namely to keep pressure acting on or within the actuator (the load pressure) the same as the control or pilot pressure. Moreover, pressure regulation and control is intrinsic to the PCV because of the configuration and function of the dual spools and the intrinsic feedback system, thus eliminating the need for electronically or mechanically user controlled feedback systems.

The PCV actuates, and therefore regulates pressure, via an intrinsic feedback system that functions in response to a pressure differential existing between the load pressure (or feedback pressure) and the pilot pressure, wherein the pressure differential may be generated by any one of or both of a change in load pressure or pilot pressure. Two independent spools, namely a pressure spool and a return spool, freely situated or disposed within the PCV function to regulate fluid flow, and therefore pressure, through respective pressure and return ports, thereby systematically controlling the pressurized fluid input into the system, as well as the fluid returning from the system to the fluid reservoir. Actuation of the PCV effectively means intrinsic actuation of at least one or both of the spools in response to the pressure differential in an effort to dissipate the pressure differential and to restore a state of equilibrium between the pilot pressure and the feedback or load pressure. As a result of the configuration of the PCV, the dual independent spools intrinsically and systematically respond to the pressure differential between the internal pilot pressure and/or the load pressure by displacing to either regulate fluid flow, and more specifically pressure, through the pressure ports or the return ports or both. Specifically, when the load pressure exceeds the pilot pressure, the return spool displaces to open the return port, thus relieving pressure within the system, in attempt to maintain pressure equilibrium within the system. Conversely, when the pilot pressure exceeds the load pressure, the pressure spool displaces to open the pressure port, thus increasing pressure within the system, also in an attempt to maintain pressure equilibrium within the system. In another aspect, the return and pressure ports may be partially open and/or closed at the same time in order to regulate pressure within the system and to achieve a pre-determined system pressure state.

When the pilot pressure forces the pressure spool to open the pressure port, thus allowing pressurized fluid into the system, the PCV transmits the resulting pressure to the actuator, which converts the pressure into a force to drive the load. When an external force is applied to the load, thus increasing the load pressure within the system, the actuator converts this force into a pressure, wherein the increased pressure causes the return spool of the PCV to displace to open the return port to purge pressure from the system in an attempt to maintain a state of equilibrium between the pilot pressure and the load pressure. Moreover, the PCV is configured to provide the ability for the load to freely move or swing (referred to herein as dangle) under its own weight or in response to an external force. This is accomplished by selectively lowering and maintaining the pilot pressure below the feedback pressure so that the return spool displaces to open the return port, thus reducing pressure losses in the system and allowing fluid to slosh or shunt back and forth between the actuator and the pressure control valve, and/or optionally the return fluid reservoir. Each of the above aspects are discussed in greater detail below.

In some embodiments, and under certain system parameters, the PCV operates without significantly using or diluting the primary fluid reserve that has been pressurized. This is achieved by providing separate and independent pressure and return spools for controlling the pressurized fluid and the fluid returning to the reservoir, respectively. Separate, independent spools also allow area ratio hydraulic multiplication to take place at the valve rather than at the actuator, thus requiring only minimal amounts of pressurized fluid in order to increase or decrease the force output of the hydraulic system. This creates a servo or servo-type system that is primarily concerned with conserving fluid consumption and preserving the main pressure source rather than requiring large amounts of fluid as do prior related systems. If the ratios are changed at the valve, then delicate motions by the actuator will not use the entire fluid supply but will instead use a fraction of the fluid used in conventional servo systems. In other words, under certain system parameters the dual independent spool valves are capable of allowing fluid to flow through the return of one or more actuators and one or more pressure control valves independent of, and/or without significantly disturbing, the main pressure source.

The present invention PCV provides several advantages over prior related pressure control valves. First, the system focuses on the control and regulation of pressure instead of on the control and regulation of flow. Indeed, flow control is a secondary consideration of the present invention. Second, because the feedback system is intrinsic, the PCV is capable of allowing operation at significantly higher bandwidths without going unstable. Third, energy efficiency is greatly improved as a result of the PCV to enter a slosh mode. Fourth, the system is able to exhibit improved dynamic behavior due to its high control of loop torque. In other words, because of the configuration of the PCV, the system is able to achieve significantly improved high torque loop gain with stability. Fifth, the PCV allows the system to achieve high torque loop gain, while simultaneously providing for the ability to dangle. This is an improved or enhanced passive motion capability. Sixth, the PCV is able to operate at select times without using or diluting the primary pressurized fluid reserve. In other words, the PCV preserves the main pressure source by not disturbing that, but instead, dealing with the flow of fluids independent of this source. Seventh, the PCV provides the ability of the system to absorb high loads at high bandwidths, while remaining stable. Other advantages not specifically recited herein will be apparent to one skilled in the art. As such, those that are specifically recited herein should not be construed as limiting in any way.

Intrinsically Regulated Pressure Control Valve

With reference to FIG. 1, illustrated is a cut-away view, as taken along a longitudinal cross-section, of one exemplary embodiment of a present invention valving system, namely a dual independent spool pressure control valve. Specifically, FIG. 1 illustrates a dual independent spool pressure control valve (PCV) 10 configured for regulating pressure within a closed-loop system, such as a hydraulic system. In the exemplary embodiment shown, the PCV 10 comprises a valve body 12 consisting of an in-line linear structure having formed therein a return inlet port 14, a return outlet port 16, a pressure inlet port 18, a pressure outlet port 20, first and second feedback ports in the form of a return feedback port 22 and a pressure feedback port 24, and a pilot pressure port 26. The PCV 10 further comprises dual independent spools, namely return spool 40 and pressure spool 50, commonly disposed within and situated about a longitudinal axis of the valve body 12. Return and pressure spools 40 and 50 are freely disposed and supported within valve body 12 and restricted in movement by one or more limiting means, such as spool stops 34, 44, 54 and 58.

As shown, this particular embodiment of the valve body 12 comprises a cylindrical, tube shape structure having an interior cavity 60 defined therein by the wall segment of the valve body 12. The interior cavity 60 is configured to contain or house each of the pressure and return spools 40 and 50, as well as to accommodate their displacement. Indeed, the interior cavity 60 comprises a diameter or cross-sectional area that is slightly larger than the diameter or cross-sectional area of the return and pressure spools 40 and 50, thus allowing the return and pressure spools 40 and 50 to move bi-directionally therein, as well as to adequately seal against the inside surface of the wall segment of the valve body 12 as needed. The size of the interior cavity 60 with respect to the return and pressure spools 40 and 50 is such that the return and pressure spools 40 and 50 are able to maintain their orientation within the interior cavity 60 as they are caused to displace back and forth therein.

The interior cavity 60, and the return and pressure spools 40 and 50, may also be configured to achieve a sealed relationship. In essence, the valve body 12, and particularly the interior cavity 60, has defined therein various chambers. As shown in FIG. 1, valve body 12 comprises a pilot pressure chamber 28 defined by the distance or area between the return and pressure spools 40 and 50, a return feedback chamber 62 defined by the area between the return spool 40 and an end of the valve body 12, and a pressure feedback chamber 68 defined by the area between the pressure spool 50 and an opposing end of the valve body 12. Each one of these chambers varies in size depending upon the realized displacement of one or both of the return and pressure spools 40 and 50 during actuation of the PCV. Each of chambers 62 and 68 are sealed from pilot pressure chamber 28 by the interaction of return and pressure spools 40 and 50 with the inside surface of the wall of the valve body 12.

Providing a sealed relationship between the return and pressure spools 40 and 50 with the valve body 12 functions to maintain the integrity of the system by eliminating unwanted fluid crosstalk and pressure leaks. The return and pressure spools 40 and 50 may comprise a sealed relationship to the valve body 12 using any known means in the art. In the embodiment of FIG. 1, acceptable sealing with very low internal leakage is achieved by using very tight manufacturing tolerances. This approach results in very low friction between spools 40 and 50 and the interior walls of valve body 12. Whatever type of sealing arrangement used, however, the return and pressure spools 40 and 50 are to be configured to displace in response to the pressure differentials acting within the system in an attempt to equalize the pilot pressure and the load or feedback pressure.

Both the return and pressure spools 40 and 50 comprise a geometric configuration or shape that matches or substantially matches or conforms to the geometric configuration or shape of the interior cavity 60 of the valve body 12. As shown, return and pressure spools 40 and 50 are generally cylindrical in shape, and comprise two lands and a recess therebetween, as well as first and second sides. Specifically, in the embodiment shown in FIG. 1, return spool 40 comprises a pilot pressure side 42, a feedback pressure side 46, a first land 72, a second land 74, and a recess 82 extending between lands 72 and 74. Pressure spool 50 comprises a similar geometric configuration or design in that it also comprises a pilot pressure side 52, a feedback pressure side 56, a first land 76, a second land 78, and a recess 84 extending between lands 76 and 78.

As noted above, feedback side 46 of return spool 40 is in fluid communication with return feedback chamber 62, while pilot pressure side 42 is in fluid communication with the pilot pressure chamber 28. Lands 72 and 74 comprise a suitable diameter or cross-sectional area so as to be able to seal against the interior wall surface of the valve body 12. As sealed, and during displacement of the return spool 40, lands 72 and 74 minimize fluid communication or fluid crosstalk between feedback chamber 62, recess 82, and pilot pressure chamber 28. In addition, lands 72 and 74 function with recess 82, since it is smaller in diameter than lands 72 and 74, to facilitate the proper flow of fluid through return inlet port 14 to outlet port 16. Indeed, once these ports are opened, the fluid flows into the PCV 10 through the return inlet port 14, through the recess 82 of the return spool 40, and out the return outlet port 16.

Also as noted above, feedback side 56 of pressure spool 50 is in fluid communication with pressure feedback chamber 68, while pilot pressure side 52 of pressure spool 50 is in fluid communication with the pilot pressure chamber 28. Lands 76 and 78 also comprise a suitable diameter or cross-sectional area so as to be able to seal against the interior wall surface of the valve body 12. As sealed, and during displacement of the pressure spool 40, lands 76 and 78 minimize fluid communication or fluid crosstalk between feedback chamber 68, recess 84, and pilot pressure chamber 28. In addition, lands 76 and 78 function with recess 84, since it is smaller in diameter than lands 76 and 78, to facilitate the proper flow of fluid through pressure inlet port 18 to pressure outlet port 20. Indeed, once these ports are opened, fluid flows into the PCV 10 through the pressure inlet port 18, through the recess 84 of the pressure spool 50, and out the pressure outlet port 20.

The PCV 10, and particularly the valve body 12, further comprises several ports that function to facilitate fluid flow through the PCV 10 and that communicate with the interior cavity 60. In the embodiment shown, the valve body 12 has formed therein several inlet and outlet ports that are regulated by the positioning of the return and pressure spools 40 and 50. Specifically, the valve body 12 comprises a return inlet port 14 and a return outlet port 16, wherein the return spool 40 is caused to displace to open these ports to allow fluid to flow therethrough and pressure to be purged from the PCV 10, and the system in which it is operating, in those conditions when the load pressure exceeds the pilot pressure. The valve body 12 also comprises a pressure inlet port 18 and a pressure outlet port 20, wherein the pressure spool 50 is caused to displace to open these ports to allow fluid to flow therethrough and pressure to be input into the PCV 10, and the system in which it is operating, in those conditions when the pilot pressure exceeds the load pressure.

The relative position of the return and pressure inlet and outlet ports 14, 16, 18, and 20 along the valve body 12 and with respect to the return and pressure spools 40 and 50 are configured so that when the return inlet and outlet ports 14 and 16 are open, or partially open, the pressure inlet and outlet ports 18 and 20 are closed, or partially closed, and vice versa. Thus, the PCV 10, and more particularly the return and pressure spools 40 and 50 and the return and pressure inlet and outlet ports 14, 16, 18, and 20, are configured so that these conditions are met, thus allowing the PCV to function as intended depending upon the pressures acting within the system. One skilled in the art will recognize other design alternatives, other than the specific ones illustrated and described herein, for satisfying these conditions.

In the embodiment shown in FIG. 1, the return inlet and outlet ports 14 and 16 are shown closed by the return spool 40 as positioned within the valve body 12. Pressure inlet and outlet ports 18 and 20 are also shown closed by the pressure spool 50 as positioned within the valve body 12. This condition or operating configuration represents equivalent load (or feedback) and pilot pressures, wherein the system is balanced and in a state of equilibrium. In other words, the PCV 10 is static as no pressure differential exists within the system to displace either of the return or pressure spools 40 and 50. Indeed, pressure is neither being input into the system through pressure ports 18 and 20, nor being purged from the system through the return ports 14 and 16, as the system is balanced between the equivalent pilot and load pressures. Thus, any loads controlled by the PCV will be static.

The return inlet port 14 fluidly communicates with recess 82 in return spool 40 and a load actuator, such as a hydraulic actuator (not shown). In contrast, the return outlet port 16 fluidly communicates with the recess 82 in return spool 40 and a primary return reservoir (also not shown). The fluid communication between these various return ports is controlled by return spool 40, as is discussed in greater detail below. It will be appreciated, however, that when the load (or feedback) pressure exceeds the pilot pressure, the return spool 40 is caused to displace to open the return inlet and outlet ports 14 and 16, thus allowing fluid to flow through the return inlet port 14, into recess 82 in return spool 40, and subsequently through the return outlet port 16 toward the primary return reservoir to purge pressure from the system. Once a state of equilibrium is reached, the return spool 40 will displace to close the return ports 14 and 16.

One of the unique aspects of the present invention is that the control or pilot pressure in the system may be dropped and maintained at a level sufficient to open the return spool 40 and the return inlet and outlet ports 14 and 16. In this mode, the PCV 10 functions to allow fluid to slosh or shunt back and forth between the load actuator (hydraulic actuator) and the return reservoir through the return inlet and outlet ports 14 and 16 according to the movement of the load. This effectively allows the load to free swing or dangle without requiring any active input to drive the load in either direction. The concept of dangling when the PCV 10 is in the slosh mode is discussed in greater detail below.

The pressure inlet port 18 fluidly communicates with the recess 84 in pressure spool 50 and a pressurized fluid source 19. In contrast, the pressure outlet port 20 fluidly communicates with recess 84 in pressure spool 50 and the load actuator. The fluid communication between these various ports is controlled by the pressure spool 50, as is discussed in greater detail below. It will be appreciated, however, that when the pilot pressure exceeds the load (or feedback) pressure, the pressure spool 50 displaces to open the pressure inlet and outlet ports 18 and 20, thus allowing pressurized fluid to flow through the pressure inlet port 18, into recess 84 in pressure spool 50, and subsequently through the pressure outlet port 20 to supply pressure to the load actuator, which converts the increased pressure to a force that actively drives the load.

The valve body 12 further has formed therein a pilot pressure port 26 configured to receive pressurized fluid having a corresponding pilot or control pressure and direct it into the pilot pressure chamber 28. The pilot pressure port 26 fluidly communicates with a pilot valve 31 configured to supply pressurized fluid from a fluid source, such as a pump, to the pilot pressure chamber 28. The pressurized fluid (thus, the pilot or control pressure) input into the pilot pressure chamber 28 through the pilot pressure port 26 functions to act upon a pilot pressure side 42 of return spool 40 and a pilot pressure side 52 of pressure spool 50 to influence the displacement of the return and pressure spools 40 and 50 away from each other. In addition, the pilot pressure input into the pilot pressure chamber 28 functions to oppose or counteract the load or feedback pressure that is also acting on the return and pressure spools 40 and 50 through the fluid feedback system. As such, the pilot pressure functions as a control pressure for the PCV 10 and the system. Indeed, the pilot pressure may be selectively increased or decreased or held constant relative to the load pressure to control the displacement of the return and pressure spools 40 and 50, and therefore the pressure within the system. Varying or changing the pilot pressure may be done very rapidly, which allows the PCV to act like a dynamically pre-defined fixed pressure regulator.

It will be appreciated that the size of the pilot pressure chamber 28 can vary with the magnitude of the pilot pressure and the resultant displacement position of the return and pressure spools 40 and 50 within the valve body as opposed by the load pressure acting through the feedback system. Thus, the varying size of the pilot pressure chamber 28 is a function of the relationship between the pilot pressure and the load or feedback pressure. It will also be appreciated that a pilot pressure chamber 28 will always exist in the PCV 10 as the return and pressure spools 40 and 50 are prohibited from making contact with each other no matter the magnitude of the load pressure. Indeed, the return and pressure spools 40 and 50 are limited in the distance they are allowed to displace as a result of the limits imposed by the ends of the valve body 12, as well as various means strategically placed within the interior cavity 60 of the valve body.

The limiting means are intended to control the displacement distance each of the return and pressure spools 40 and 50 are allowed to travel within the valve body 12. More specifically, the limiting means function to establish a pre-determined operating position for each of the spools during the various operating states or modes of the PCV 10. One exemplary form of limiting means is a plurality of spool stops strategically positioned within the interior cavity 60 of the valve body 12 to prevent unwanted displacement of the spools within the valve body 12. FIG. 1 illustrates these as spool stops 34, 44, 54 and 58. Return and pressure spools 40 and 50 are unable to come into contact with one another due to spools stops 34 and 54, wherein spool stop 34 restricts the movement of the return spool 40 so that it can never close the pilot port 26, and spool stop 54 restricts the movement of the pressure spool 50 from doing the same. Thus, the pilot pressure chamber 28 is always present and accessible to receive fluid from the pilot pressure source 29 through the pilot pressure port 26.

Return feedback port 22, formed in a first end of the valve body 12, facilitates the fluid communication of the load actuator (not shown), which may comprise a load actuator such as a hydraulic actuator, with the return feedback chamber 62 and the feedback pressure side 46 of return spool 40 functioning as one boundary for the feedback chamber 62. Thus, fluid from the load actuator can flow through the return feedback port 22 and into the feedback chamber 62, thereby communicating a feedback pressure to the feedback pressure side 46 of the return spool 40. The feedback chamber 62 comprises a pre-determined diameter or cross-sectional area, which converts the load pressure into a feedback force to be exerted on the return spool 40.

It will be appreciated that when the feedback pressure in the return feedback chamber 62 is greater than the pilot pressure in the pilot pressure chamber 28, the return spool 40 will displace towards the center of the pilot pressure chamber 28 until it contacts the spool stop 34, thus opening the return inlet and outlet ports 14 and 16 to release and lower the actuator pressure. The return spool 40 stays in this position until the load pressure and the pilot pressure equalize. Conversely, when the feedback pressure in the feedback chamber 62 is less than the pilot pressure in the pilot pressure chamber 28, the return spool 40 will displace towards the end of the valve body 12 away from the pilot pressure chamber 28 until it contacts the spool stop 44. In this position, the return inlet and outlet ports 14 and 16 are closed allowing the system pressure to increase. The return spool 40 maintains this position until the pressure in the feedback chamber 62 again exceeds the pilot pressure in the pilot pressure chamber 28.

Similarly, pressure feedback port 24, formed in a second end of the valve body 12, facilitates the fluid communication of the load actuator (not shown) with the pressure feedback chamber 68 and the feedback pressure side 56 of the pressure spool 50 functioning as one boundary for the feedback chamber 68. Thus, fluid from the load actuator can flow through the pressure feedback port 24 and into the feedback chamber 68, thereby communicating a feedback pressure to the feedback pressure side 56 of the pressure spool 50. The feedback chamber 68 comprises a pre-determined diameter or cross-sectional area, which converts the load pressure into a feedback force to be exerted on the pressure spool 50.

It will be appreciated that when the feedback pressure in the pressure feedback chamber 68 is greater than the pilot pressure in the pilot pressure chamber 28, the pressure spool 50 will displace towards the center of the pilot pressure chamber 28 until it contacts the spool stop 54, thus closing the pressure inlet and outlet ports 18 and 20. The pressure spool 50 maintains this position until the load pressure and the pilot pressure equalize. Conversely, when the feedback pressure in the feedback chamber 68 is less than the pilot pressure in the pilot pressure chamber 28, the pressure spool 50 will displace towards the end of the valve body 12 away from the pilot pressure chamber 28, thus opening the pressure inlet and outlet ports 18 and 20 to increase the system pressure. The pressure spool 50 maintains this position until the pressure in the feedback chamber 68 again exceeds the pilot pressure in the pilot pressure chamber 28, at which time the pressure inlet and outlet ports 18 and 20 are closed.

As discussed, limiting means, namely, spool stops 34, 44, 54 and 58, respectively, are configured to limit the movement of return and pressure spools 40 and 50 within the interior cavity 60 of the valve body 12. More specifically, the limiting means are configured to ensure the proper displacement and alignment of the return and pressure spools 40 and 50 with respect to the return and pressure inlet and outlet ports 14, 16, 18, and 20, as well as the pilot pressure port 26. As noted above, spool stops 34 and 54 restrict the movement of return and pressure spools 40 and 50 towards each other. Specifically, spool stop 34 is positioned such that return spool 40 cannot close pilot pressure port 26. Spool stop 34 also prevents fluid communication between the return inlet and outlet ports 14 and 16 and the return feedback port 22.

Spool stop 44 restricts the displacement of the return spool 40 towards the end of the valve body 12, as shown. Specifically, spool stop 44 is positioned such that the return inlet and outlet ports 14 and 16 are closed when the return spool 40 contacts the spool stop 44. It will also be appreciated that the position of spool stop 44 also prevents fluid communication between the return inlet and outlet ports 14 and 16 and the pilot pressure chamber 28.

Spool stop 54 restricts the movement of the pressure spool 50 towards the return spool 40 and the pilot chamber 28. Specifically, spool stop 54 is positioned such that the pressure inlet and outlet ports 18 and 20 are closed when the pressure spool 50 contacts the spool stop 54. Spool stop 54 prevents fluid communication of the pressure inlet and outlet ports 18 and 20 with the pressure feedback port 24.

Spool stop 58 restricts the displacement of the pressure spool 50 towards the end of the valve body 12, as shown. Specifically, spool stop 58 is positioned such that the pressure inlet and outlet ports 18 and 20 are closed when the pressure spool 50 contacts the spool stop 58. It will also be appreciated that the position of spool stop 58 also prevents fluid communication between the pressure inlet and outlet ports 18 and 20 and the pilot pressure chamber 28.

As stated, the PCV 10 comprises dual, independent spools, namely return spool 40 and pressure spool 50, that are preferably freely situated or supported within the interior cavity 60 of the valve body 12. By freely supported it is meant that the spools are not attached to each other or any other structure or device, such as mechanical actuating or supporting means. In other words, the spools float within the interior of the valve body and are constrained in their movement or displacement only by the pressures acting upon them and any limiting means located in the valve body 12. In one aspect, the return and pressure spools 40 and 50 are low mass spools. However, the mass of the spools may vary depending upon the application.

Return and pressure spools 40 and 50 are intended to operate within the valve body 12 independent of one another. The term "independent" or the phrase "independently controlled and operated" or any other similar terminology or phraseology, as used herein, is intended to mean that the two spools are operated or controlled individually or separately and that they are free from interconnection with or interdependence upon one another. This also means that the return and pressure spools 40 and 50 displace or are caused to displace in response to the intrinsic pressure parameters acting within the system at any given time and not by any mechanically or electrically controlled actuation device or system. More specifically, the PCV is intended to regulate pressure within the system it is contained in accordance with the pressure feedback system intrinsic to the PCV, wherein the return and pressure spools are caused to displace in accordance with a pressure differential occurring or acting within the system in an attempt to dissipate the pressure differential and to equalize the pilot pressure and the load or feedback pressure. In the embodiment of FIG. 1, a pressure differential exists when the load or feedback pressure acting on the outside faces of the return and pressure spools differs from the pilot pressure concurrently acting on the inside faces of the return and pressure spools. As these two pressures concurrently acting on opposite sides of the return and pressure spools differ, and depending upon the dominant pressure, the return and pressure spools will displace to open and close the appropriate ports that would facilitate or cut off the fluid flow needed to balance the overall system pressure or that would attempt to balance the load pressure in the load actuator and the pilot pressure.

In the PCV 10, a pressure differential is created when the feedback pressure acting on the feedback pressure sides of the return and pressure spools 40 and 50 comprises a different magnitude than the pressure acting on the pilot pressure sides of the return and pressure spools 40 and 50. This pressure differential may be in favor of the load pressure or the pilot pressure. Either way, the return and pressure spools 40 and 50 are designed to displace in response to the pressure differential in an attempt to restore the pilot pressure and the load or feedback pressure to a state of equilibrium. However, the pilot pressure, since it is specifically and selectively controlled, will be capable of inducing a pre-determined pressure differential for a pre-determined duration of time. Thus, if the pressure in the system needs to be increased, the pilot pressure is selectively manipulated to exceed the load or feedback pressure, thus causing the pressure spool 50 to displace to open pressure inlet and outlet ports 18 and 20 and to let pressurized fluid from the pressure source into the system. Likewise, if the pressure in the system needs to be reduced, the pilot pressure can be selectively manipulated to be less than the load or feedback pressure, thus causing the return spool 40 to displace to open return inlet and outlet ports 14 and 16 and to purge pressure from the system. It should be noted that a pressure differential may be induced in the system by manipulation of the pilot pressure or the load. Either way, the resulting displacement of spools functions to open and close the appropriate inlet and outlet ports to regulate the pressure within the system.

Both the return and pressure spools 40 and 50 comprise a geometric configuration or shape that matches or substantially matches or conforms to the geometric configuration or shape of the interior cavity 60 of the valve body 12. As shown, return and pressure spools 40 and 50 are generally cylindrical in shape, and comprise two lands and a recess therebetween, as well as first and second sides. Specifically, in the embodiment shown in FIG. 1, return spool 40 comprises a pilot pressure side 42, a feedback pressure side 46, a first land 72, a second land 74, and a recess 82 extending between lands 72 and 74. Pressure spool 50 comprises a similar geometric configuration or design in that it also comprises a pilot pressure side 52, a feedback pressure side 56, a first land 76, a second land 78, and a recess 84 extending between lands 76 and 78.

As noted above, feedback side 46 of return spool 40 is in fluid communication with feedback chamber 62, while pilot pressure side 42 is in fluid communication with the pilot pressure chamber 28. Lands 72 and 74 comprise a suitable diameter or cross-sectional area so as to be able to seal against the interior wall surface of the valve body 12. As sealed, and during displacement of the return spool 40, lands 72 and 74 prevent fluid communication or fluid crosstalk between feedback chamber 62, recess 82, and pilot pressure chamber 28. In addition, lands 72 and 74 function with recess 82, since it is smaller in diameter than lands 72 and 74, to facilitate the proper flow of fluid through return inlet port 14 to outlet port 16. Indeed, once these ports are opened, the fluid flows into the PCV 10 through the return inlet port 14, through the recess 82 of the return spool 40, and out the return outlet port 16.

Also as noted above, feedback side 56 of pressure spool 50 is in fluid communication with feedback chamber 68, while pilot pressure side 52 of pressure spool 50 is in fluid communication with the pilot pressure chamber 28. Lands 76 and 78 also comprise a suitable diameter or cross-sectional area so as to be able to seal against the interior wall surface of the valve body 12. As sealed, and during displacement of the pressure spool 40, lands 76 and 78 prevent fluid communication or fluid crosstalk between feedback chamber 68, recess 84, and pilot pressure chamber 28. In addition, lands 76 and 78 function with recess 84, since it is smaller in diameter than lands 76 and 78, to facilitate the proper flow of fluid through pressure inlet port 18 to pressure outlet port 20. Indeed, once these ports are opened, fluid flows into the PCV 10 through the pressure inlet port 18, through the recess 84 of the pressure spool 50, and out the pressure outlet port 20.

In accordance with the immediate discussion, one of the unique features of the present invention PCV is its intrinsic feedback system. Unlike prior related systems that focus on and function to control fluid flow, this intrinsic feedback system functions to allow the PCV to regulate and control the pressures within a servo or servo-type system automatically, in response to induced conditions, or in a manipulative manner, all without requiring external control means. The intrinsic feedback system is a function of the fluid communication between the various components of the PCV and the pilot and load pressures. More particularly, the intrinsic feedback system is a function of the communication between the pilot and feedback pressures acting on opposing sides of the independent return and pressure spools, wherein the feedback and pilot pressures oppose one another, and wherein the feedback pressure is a function of the load pressure. The independent return and pressure spools, which may be considered floating spools within the valve body, are configured to act in concert with one another to systematically displace, in accordance with an induced pressure differential, to open the appropriate ports to either increase or decrease overall system pressure. Owing to the various limiting means strategically placed within the system, as well as the relative positioning of the return and pressure inlet and outlet ports, the independent return and pressure spools are configured to displace accordingly to restore the servo system to as close a state of equilibrium as possible, limited only by system constraints and/or selective and controlled operating conditions. Various examples of the present invention PCV intrinsic feedback system are illustrated in the figures and described below with respect to the various operating states of the PCV.

Return and pressure spools 40 and 50 will move to specific positions in response to the pilot pressure, which is controlled according to whether it is desired that a pressure within the load actuator be increased, whether the load actuator is to be allowed to relax, or whether the load actuator will be required to hold a sustained load.

Finally, first and second feedback ports 22 and 24 are in fluid communication with first and second feedback lines 192 and 196, respectively, wherein the first and second feedback lines 192 and 196 are configured to receive fluid from or transmit fluid to main line 200. Main fluid line 200 fluidly connects to the load actuator (not shown) through a load feed line 210.

While FIG. 1 illustrates one exemplary embodiment of a PCV, it will be appreciated that other embodiments are contemplated herein. Indeed, the PCV shown in FIG. 1 may be modified to comprise return and pressure spools 40 and 50 of different configurations or sizes. Naturally, however, the valve body 12 would have to comprise corresponding diameters differences to accommodate the different sized spools. Therefore, in other embodiments, it is contemplated that the valve body 12, and the independent spools disposed therein, may comprise uniform or non-uniform diameters, as well as different geometric cross-sectional shapes other than circular. Additionally, ports 14, 16, 18, 20, 22, 24 and 26 in valve body 12 can vary in size, and various size and shape combinations are anticipated in order to obtain particular pressure-force-area relationships necessary for a specific or given application.

Figure 2:
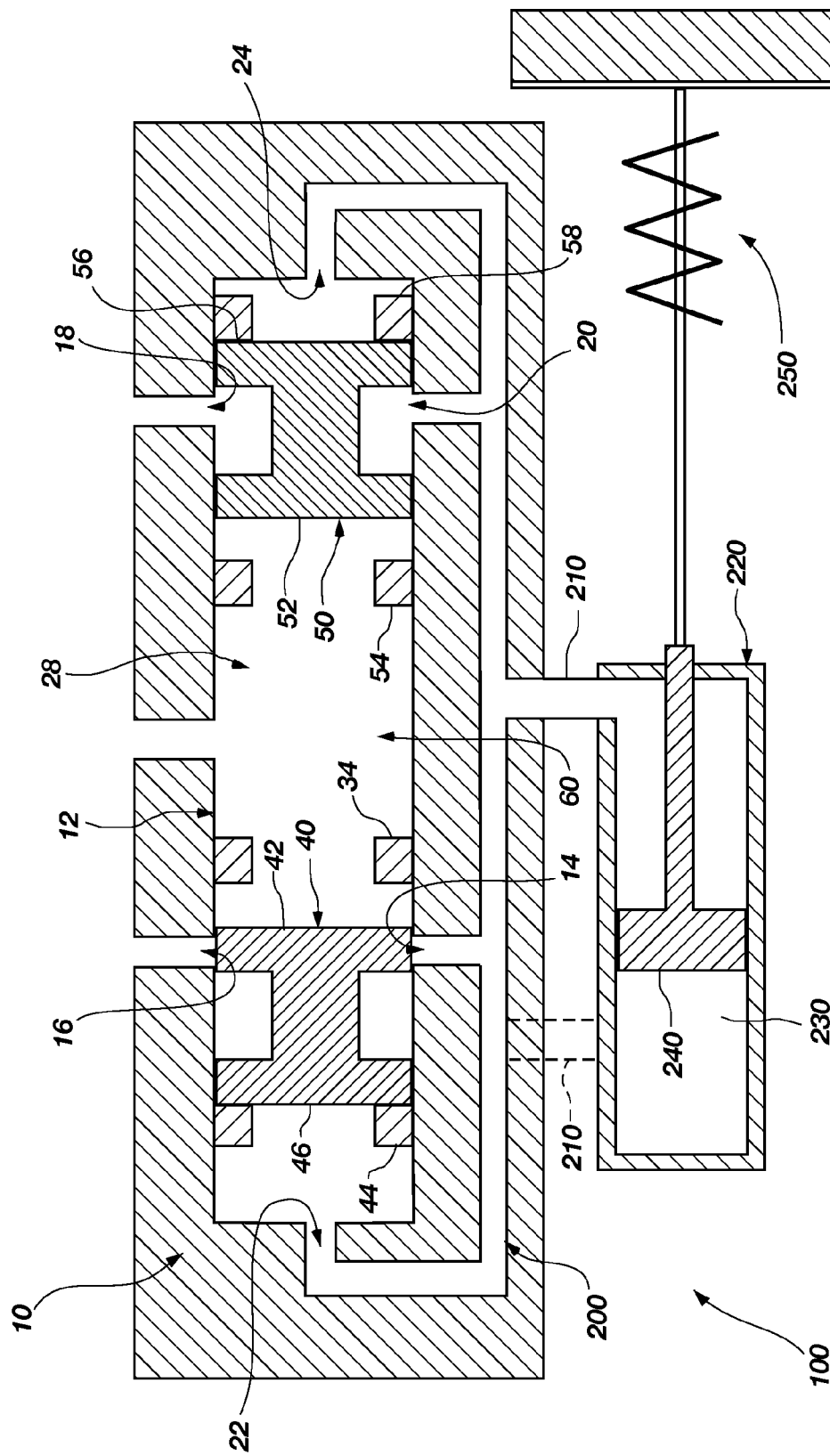
FIG. 2 illustrates a cut-away, cross-sectional view of the exemplary dual independent spool pressure control valve shown in FIG. 1, wherein the valve is in an actuated state to allow pressurized fluid to enter in to a servo-type system as the pilot pressure exceeds the feedback pressure.

With reference to FIG. 2, illustrated is a cut-away view, taken along a longitudinal cross-section, of the exemplary dual independent spool pressure control valve (PCV) discussed above, and illustrated in FIG. 1, wherein the PCV 10 is operably contained within a servo or servo-type system, and particularly a hydraulic actuator system 100. Specifically, FIG. 2 illustrates PCV 10 in an actuated state with the pressure inlet and outlet ports 18 and 20 open. In this scenario, the servo system comprises a pilot pressure that exceeds the load or feedback pressure exerted by the actuator piston 240 contained within the actuator 220 and acting upon the feedback pressure sides of return and pressure spools 40 and 50. To achieve this state, the elevated pilot pressure existing within the pilot pressure chamber 28 acts upon the pilot pressure sides 42 and 52 of the return and pressure spools 40 and 50. Because of spool stop 44, the return spool 40 is prohibited from displacing, thus return inlet and outlet ports 14 and 16 remain shut. Conversely, the pilot pressure causes the pressure spool 50 to displace as the pilot pressure acting on the pilot pressure side 52 of the pressure spool 50 overcomes the feedback pressure acting upon the feedback pressure side 56 of the pressure spool 50. As the feedback and/or load pressure is overcome, the pressure spool 50 displaces away from the spool stop 54, thus being positioned to open the pressure inlet and outlet ports 18 and 20. This allows pressurized fluid from a pressure source (not shown) to flow through the pressure inlet port 18, through the recess 84 of the pressure spool 50, out of the pressure outlet port 20, and into the hydraulic actuator 220 via a main fluid line 200. In essence, the system pressure is increased by the added pressurized fluid, thus evidencing the ability of the PCV to attempt to restore the system 100 to a state of equilibrium where the pilot pressure is equivalent to the feedback pressure. The pressure source may be configured to supply fluid at any pressure, but will typically be sufficient to drive the actuator piston 240, and subsequently the load 250, in accordance with desired operating conditions.

As mentioned, the return spool 40 is simultaneously being acted upon by the pilot pressure, which results in its continued contact with the spool stop 44, in which the return spool 40 is positioned to close the return inlet 20 and outlet ports 18, thus preventing the flow of fluid out of the system 100. It will be appreciated that the pressure spool 50 is caused to displace as a result of the pilot pressure exceeding the feedback pressure, thus, creating a pressure differential in the system 100. It will also be appreciated that the pressure spool 50 is capable of responding to the pressure differential without external controlling means, thus illustrating the intrinsic feedback capabilities of the present invention PCV.

Additionally, FIG. 2 illustrates first and second feedback ports 22 and 24, which are in fluid communication with main fluid line 200. Also in fluid communication with main fluid line are pressure and return inlet and outlet ports 14, 16, 18, and 20. Load actuator 220 is also in fluid communication with the main fluid line 200 by way of load feed line 210 (or output/load pressure port), which allows fluid to flow in and out of the actuator 220 (e.g., allows pressurized fluid to flow into the actuator 220 to displace the piston 240 and drive the load 250). The main fluid line 200 and the load feed line 210 function as the means of fluidly connecting the PCV 10 to the actuator 220 to allow the PCV 10 to function as intended.

As indicated, the pressure control valve comprises an output/load pressure port. In the embodiment shown, the main fluid line 200 is also in fluid communication with an output/load pressure port or load feed line 210 which allows fluid to flow between the main fluid line 200 and load actuator 220. In FIG. 2, load actuator 220 is a hydraulic actuator having a bottom loaded piston, meaning the load feed line 210 couples to the piston cylinder 230 below the piston 240. Increasing the pressure in the hydraulic system, thus increasing the pressure in the portion of the piston cylinder 230 below the piston 240, causes the piston 240 to move away from the load feed line 210, thus exerting a force on the load 250, represented in FIG. 2 as an inline resistor.

Consequently, load actuator 220 can exert a variable load or feedback pressure on the load feedback pressure sides 46 and 56 of return and pressure spools 40 and 50 through main feed line 200. That is, when hydraulic actuator 220 comprises a load that translates into a feedback pressure that is less then the pilot pressure, a pressure differential is created. This pressure differential causes the pressure spool 50 to displace accordingly to open pressure inlet and outlet ports 18 and 20 in an attempt to dissipate the pressure differential and to equalize the system once again. Opening these ports causes pressurized fluid to enter the system, thus causing piston 240 to exert an associated force on attached load 250. Alternatively, when load actuator 220 comprises a load that translates into a feedback pressure that is greater than the pilot pressure, a pressure differential of a different kind is created. This pressure differential causes the return spool 40 to displace accordingly to open return inlet and outlet ports 14 and 16 in an attempt to dissipate the pressure differential and to equalize the system. Opening these ports purges pressurized fluid from the system, thus lowering the overall system pressure and allowing the load to retract. As can be seen, the intrinsic feedback system allows the present invention PCV 10 to function with significant advantages over prior related systems.

Figure 3:
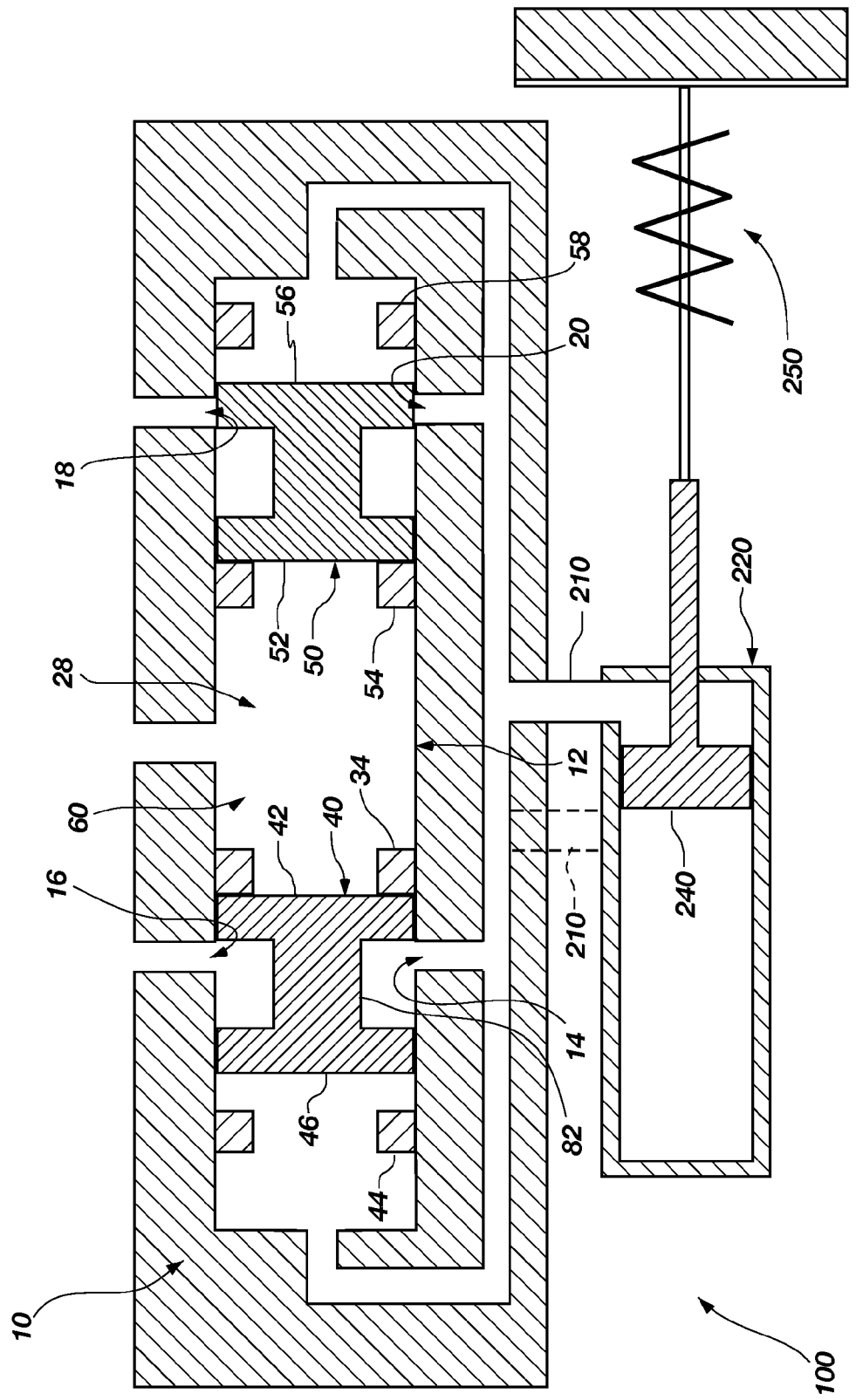
FIG. 3 illustrates a cut-away, cross-sectional view of the exemplary dual independent spool pressure control valve shown in FIG. 1, wherein the valve is in an actuated state to purge pressure from the servo-type system as the feedback pressure exceeds the pilot pressure.

With reference to FIG. 3, illustrated is a cut-away view, also taken along a longitudinal cross-section, of the exemplary dual independent spool pressure control valve (PCV) discussed above, and illustrated in FIG. 1, wherein the PCV is operably contained within a hydraulic actuator system 100. Specifically, FIG. 3 illustrates PCV 10 in a pressure relieving state, wherein the load or feedback pressure exceeds the pilot pressure in the pilot pressure chamber 28. In this state, the load feedback pressure side 46 of the return spool 40 is being acted upon by the feedback pressure to displace away from the spool stop 44, thus being positioned to open the return inlet and outlet ports 14 and 16. This allows return fluid to flow through the return inlet port 14, through recess 82 of return spool 40, out return outlet port 16, and back into the return fluid reservoir (not shown). At the same time, the load feedback pressure side 56 of the pressure spool 50 is also being acted upon by the feedback pressure to force the pressure spool 50 against the spool stop 54, thus closing the pressure inlet and outlet ports 18 and 20, and thus preventing flow of pressurized fluid through the hydraulic system 100.

It will be appreciated that the return spool 40 is caused to displace by the influence of the feedback pressure due to the pressure differential existing between the pilot pressure and the load or resulting feedback pressure. Indeed, as the feedback pressure exceeds the pilot pressure a pressure differential exists between the pilot pressure side 42 and the load feedback pressure side 46 of the floating return spool 40. A similar pressure differential acts on floating pressure spool 50. Therefore, when the load or feedback pressure is greater than the pilot pressure, and the return spool 40 is displaced to open the return inlet and outlet ports 14 and 16, the pressure spool 50 is also forced against the spool stop 54, thereby closing the pressure inlet and outlet ports 14 and 16. Opening the return inlet and outlet ports 14 and 16 functions to allow fluid to flow out of the actuator 220 and the PCV, thereby relieving pressure within the system 100.

By dropping the pilot pressure below the load pressure or feedback pressure, thus causing the return inlet and outlet ports 14 and 16 to open, another unique aspect of the PCV 10 is realized. In this state, known as the slosh mode, the return fluid is able to shunt or slosh back and forth between the PCV 10 and the actuator 220, through the return of the PCV 10, and optionally the fluid reservoir in response to the movement of the load 250, and subsequently the actuator piston 240, as it is being acted upon by an external force. In the slosh mode, the load is allowed to move without any active driving input from the system. In other words, with the PCV 10 in the slosh mode, the load is capable of swinging freely or dangling without requiring active input to move the load in either direction, as is required in prior related systems. For example, with the pilot pressure reduced and the return spool 40 displaced to open the return inlet and outlet ports 14 and 16, the load is capable of moving under external influences, such as in response to gravity.

Another aspect of dangling made possible by the PCV placed in the slosh mode is the ability of the load to move in response to momentum induced within the load as it is being actively driven. For example, the load may be driven in short bursts by the quick and periodic input of pressurized fluid. Depending upon the mass of the load and the degree of active input into the actuator 220 (e.g., pressurized fluid) to drive the load, there may be a degree of momentum induced within the load once the supply of pressurized fluid is cut off. Unlike prior related systems where this momentum would be wasted, the present invention PCV is able to enter the slosh mode, which allows the load to utilize the induced momentum to displace an additional distance unaided by any active input. Once the momentum is exhausted and the load stops moving, the pilot pressure may be increased to deactivate the slosh mode (e.g., close the return inlet and outlet ports). The load may again be driven by raising the pilot pressure to exceed that of the load or feedback pressure, thus causing the pressure spool to displace to open the pressure inlet and outlet ports to again supply pressurized fluid to the system capable of driving the load.

The ability of the load to dangle or free swing as the PCV is in the slosh mode is advantageous in that significant energy savings are realized because the load can act under gravity or its own momentum to move, thus reducing the amount of power required to manipulate the load as desired. The slosh mode and its advantages will be especially significant to the field of robotics as various robotic systems can be made to mimic human movement much more closely and with less required power input.

The terms "slosh" or the phrase "slosh mode," as used herein, shall be understood to mean or shall refer to the condition or state of the present invention PCV in which the pilot pressure is always less than the load or feedback pressure acting on the return and pressure spools, no matter the position of the load actuator piston or load pressure within the actuator, so as to actuate the return spool to open the return inlet and outlet ports, thus allowing fluid to shunt or slosh back and forth through the PCV, and particularly these opened ports, between the load actuator (or some other similar device upstream from the return inlet port) and a fluid reservoir or line downstream from the return outlet port. An example of this state is illustrated in FIG. 3.

Figure 4:
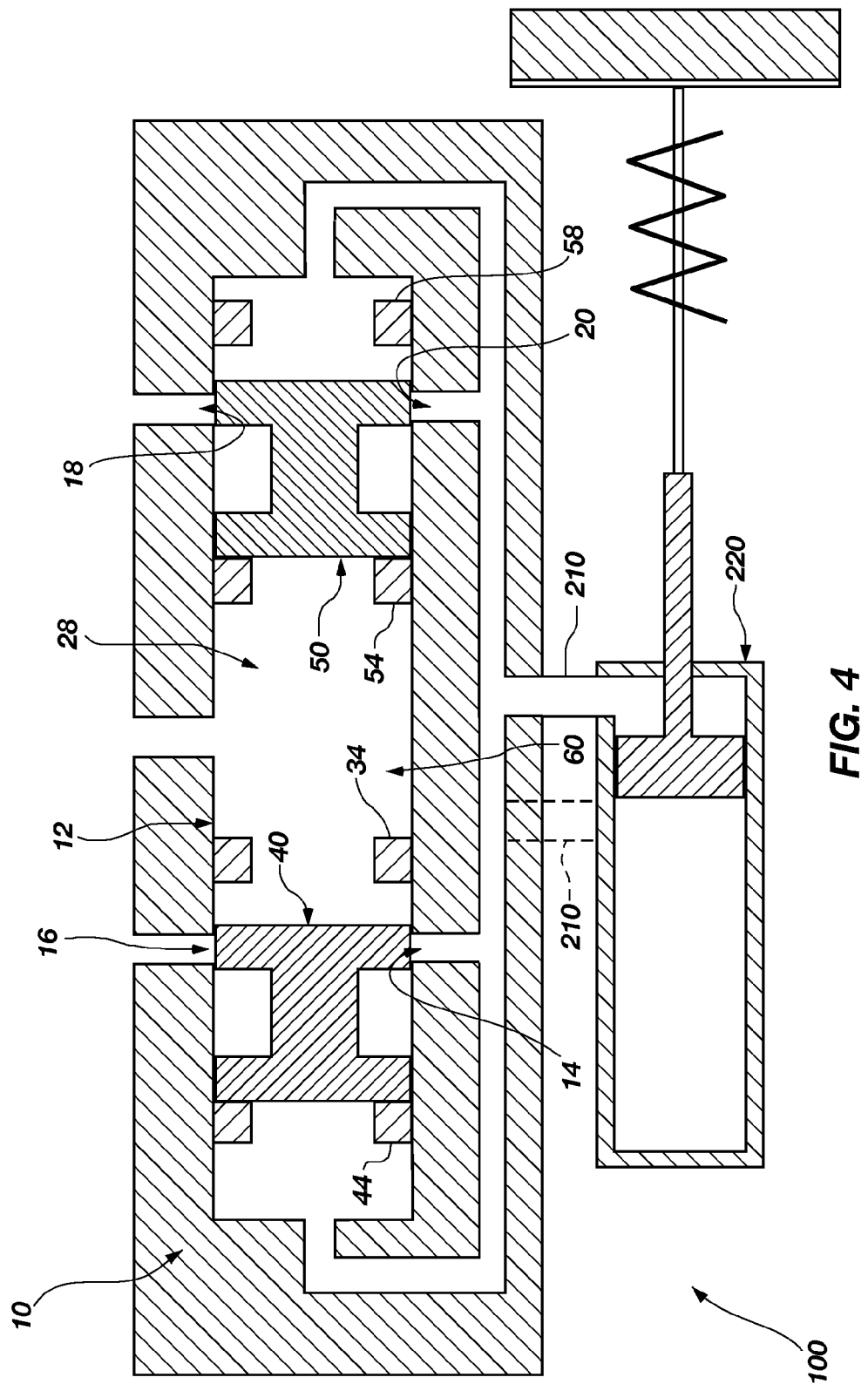
FIG. 4 illustrates a cut-away, cross-sectional view of the exemplary dual independent spool pressure control valve shown in FIG. 1, wherein the valve is in a non-actuated state where the pilot pressure equals or is substantially equal to the feedback pressure.

With reference to FIG. 4, illustrated is a cut-away view, also taken along a longitudinal cross-section, of the exemplary PCV discussed above, and illustrated in FIG. 1, wherein the PCV is again operably contained within a hydraulic actuator system 100. Specifically, FIG. 4 illustrates PCV 10 in a non-actuated state, wherein the feedback pressure is equal to the pilot pressure. In this state, the return spool 40 is caused to rest against spool stop 44, thereby closing return inlet and outlet ports 14 and 16 and preventing fluid from returning from hydraulic actuator 220 and pressure escaping the system 100. Additionally, pressure spool 50 is displaced to rest against spool stop 54, thereby closing the pressure inlet and outlet ports 18 and 20 and preventing pressurized fluid from a fluid source (not shown) from flowing into the system 100, and particularly hydraulic actuator 220. In this configuration, the hydraulic actuator 220, and the coupled load 250, is static. The load 250 will be able to move only when a pressure differential is created across the return and pressure floating spools 40 and 50. A pressure differential may be created by either increasing or decreasing the pilot pressure in the pilot pressure chamber 28, or by increasing or decreasing the load pressure acting within the hydraulic actuator 220.

Figure 5:
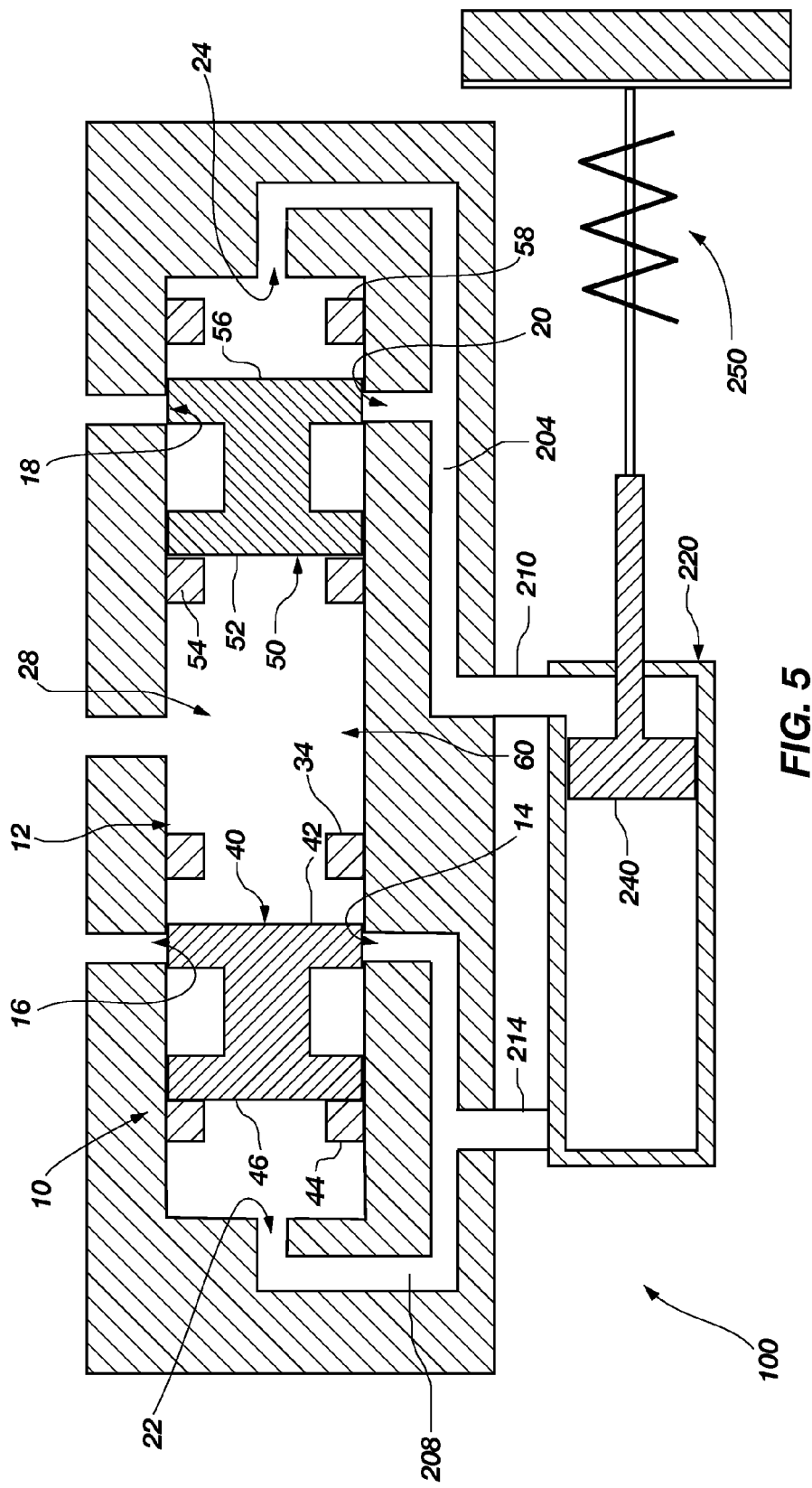
FIG. 5 illustrates a cut-away, cross-sectional view of another exemplary symmetrical dual independent spool pressure control valve, wherein the pressure feedback is disconnected from the return pressure feedback.

Referring now to FIG. 5, shown is another exemplary embodiment of a hydraulic actuator system 100 having a PCV 10 supported therein. In this embodiment, the PCV 10 comprises a main pressure line 204 that is fluidly connected, at one end, to a portion of an actuator 220 on one side of an actuator piston 240 through a load feed line 210 (or output/load pressure port), and, at another end, to the pressure inlet and outlet ports 18 and 20, as well as feedback port 24. The PCV 10 further comprises a main return line 208 that is fluidly connected, at one end, to a portion of the actuator 220 on an opposite side of the actuator piston 240 through return load line 214, and, at its other end, to the return inlet and outlet ports 14 and 16, as well as feedback port 22.

In operation, the PVC 10 functions similar to the embodiments discussed above and illustrated in FIGS. 1-4. However, in this embodiment the PCV 10 fluidly disconnects the return and pressure ports. Thus, in the event that the pilot pressure in pilot pressure chamber 28 exceeds the load or feedback pressure acting on the feedback pressure sides 46 and 56 of return and pressure spools 40 and 50, pressure spool 50 displaces to open pressure inlet and outlet ports 18 and 20. This allows pressurized fluid from a pressure source (not shown) to enter the system 100 and travel through the main pressure line 204 and the load feed line 210 into actuator 220 to drive the actuator piston 240, and subsequently the load 250 coupled thereto. On the other hand, fluid and pressure are purged from the system 100 from the opposite side of the piston 240 through the return inlet and outlet ports 14 and 16 once the pilot pressure is decreased to be below the load or feedback pressure. With the pilot pressure below the load or feedback pressure, the return spool 40 is caused to displace to purge pressurized fluid from the system 100. The pressure from the pressure source input into the system can also be selectively controlled with respect to the pilot pressure to allow the PCV 10 to function properly.

Figure 6A:
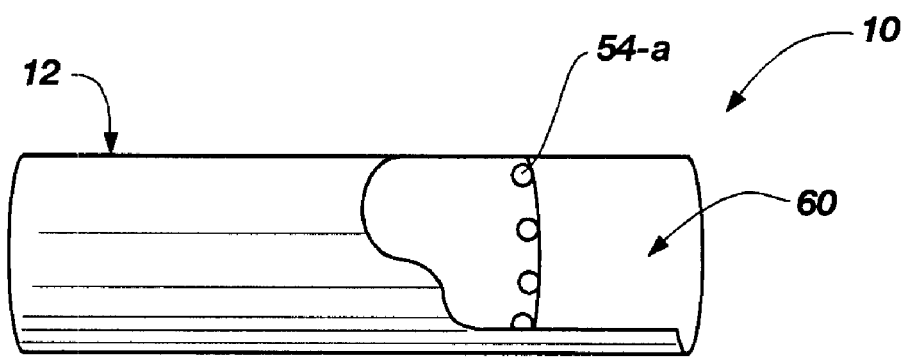
FIG. 6-A illustrates a cut-away view of one exemplary limiting means in the form of a series of nubs annularly spaced around and protruding from the interior wall portion of the valve body.
Figure 6B:
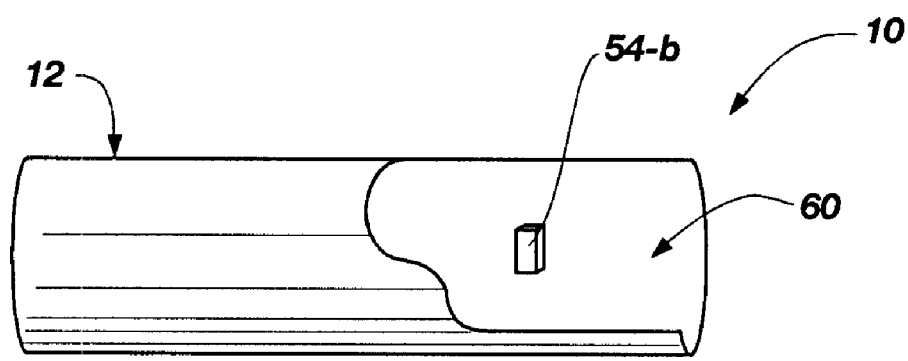
Figure 6C:
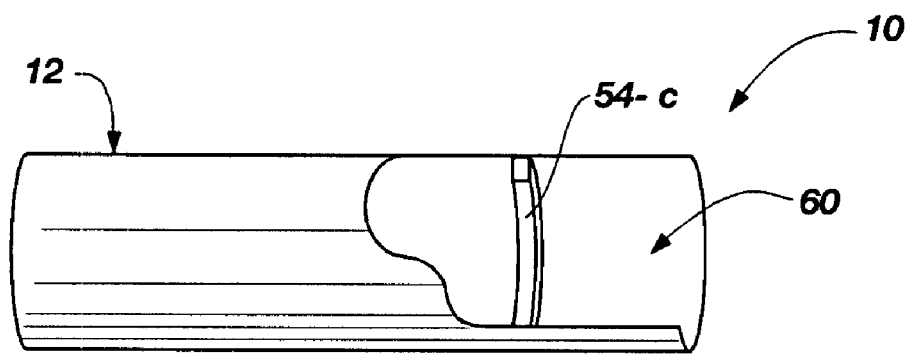

FIGS. 6-*a*-6-*c* illustrate several examples of different types of limiting means that can be utilized within the PVC 10. FIG. 6-*a* illustrates a plurality of spool stops in the form of beads 54-*a* protruding from and annularly spaced around the inside wall surface of the interior cavity 60 of the valve body 12. FIG. 6-*b* illustrates at least one spool stop in the form of a nub 54-*c* protruding from and positioned at a proper location on the inside surface of the interior cavity 60 of the valve body 12. FIG. 6-*c* illustrates a spool stop in the form of a solid ring protruding from and annularly extending around the inside wall surface of the interior cavity 60 of the valve body 12. One skilled in the art will recognize other types of limiting means that can be used to control the displacement of the return and pressure spools described herein.

Figure 7:
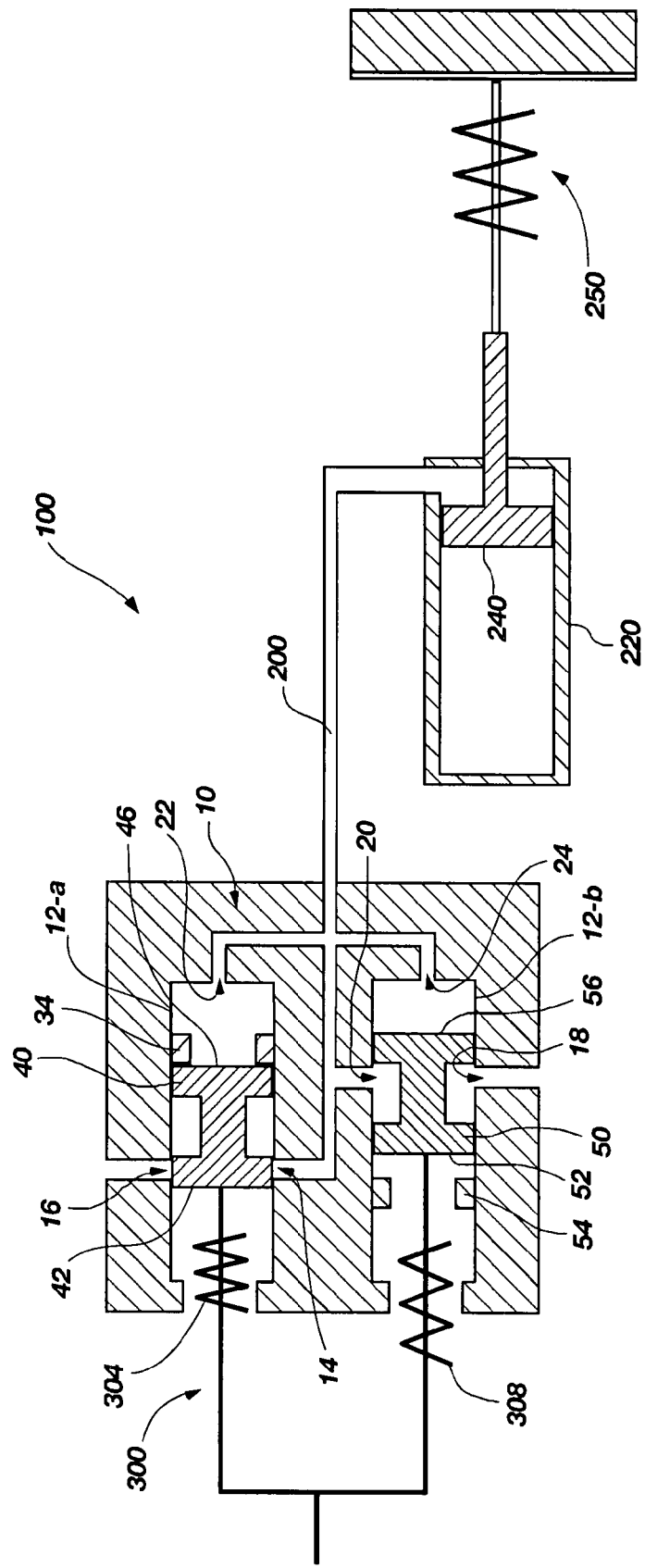
FIG. 7 illustrates another exemplary embodiment of a symmetrical pressure control valve having a mechanical pressure source configured to supply a pilot pressure to the return and pressure spools.

FIG. 7 illustrates another exemplary embodiment of a PVC 10 as contained within a hydraulic actuator system 100. In this embodiment, the PCV 10 comprises a non-linear configuration, wherein the valve body is divided into two portions, namely valve body 12-*a* and valve body 12-*b*. Other non-liner configurations are contemplated herein, although not specifically discussed. In this embodiment, valve body 12-*a* has supported therein the return spool 40, and also has formed therein the return inlet and outlet ports 14 and 16, as well as feedback port 22. Valve body 12-*b* has supported therein the pressure spool 50, and also has formed therein the pressure inlet and outlet ports 18 and 20, as well as feedback port 24.

One of the features of this embodiment is the presence of a mechanical pilot system 300 that uses mechanical energy to supply a pilot force to the pilot pressure sides 42 and 52 of the return and pressure spools 40 and 50, respectively. As shown, mechanical pilot system 300 comprises a biasing member 304 that interacts with and provides a pilot force to the pilot pressure side 42 of the return spool 40. Likewise, the mechanical pilot pressure system 300 comprises a similar biasing member 308 that interacts with and applies a pilot force to the pilot pressure side 52 of the pressure spool 50. Both biasing members 304 and 308 preferably comprise the same stiffness ratio so as to supply equivalent forces to each of the return and pressure spools 40 and 50. Any type of force application system or device known in the art can be used to actuate the mechanical pilot system 300 to supply the pilot force to the return and pressure spools 40 and 50 and is therefore not discussed in detail herein.

In operation, if a pilot force is needed to overcome a given load or feedback pressure acting on the feedback pressure sides 46 and 56 of return and pressure spools 40 and 50, the system 300 is actuated to apply the needed pilot force. In this state, the pressure spool 50 is caused to displace, thus opening the pressure inlet and outlet ports 18 and 20 allowing the PCV 10 to function as discussed above. Due to the presence of spool stop 34, the return spool 40 does not displace, but instead remains in a closed position. The mechanical pilot system 300 is able to displace the pressure spool 50 while at the same time the return spool 40 is pushed against the spool stop 34 as a result of the biasing member 304 that partially compresses, thus allowing the mechanical pilot system 300 to displace enough to open the pressure inlet and outlet ports 18 and 20.

On the other hand, if a pilot pressure is needed to be less than a given load or feedback pressure, the system 300 is actuated accordingly. In this state, the system 300 is actuated to allow the return spool 40 to displace, thus opening return inlet and outlet ports 14 and 16. In some cases, the system 300 can be inactivated altogether, wherein the pressure spool 50 remains closed due to its contact with spool stop 54. Essentially, the system illustrated in FIG. 7 works on the same principles as those discussed above, except with the use of a mechanical pilot pressure source rather than a fluid pilot pressure source.

Figure 8:
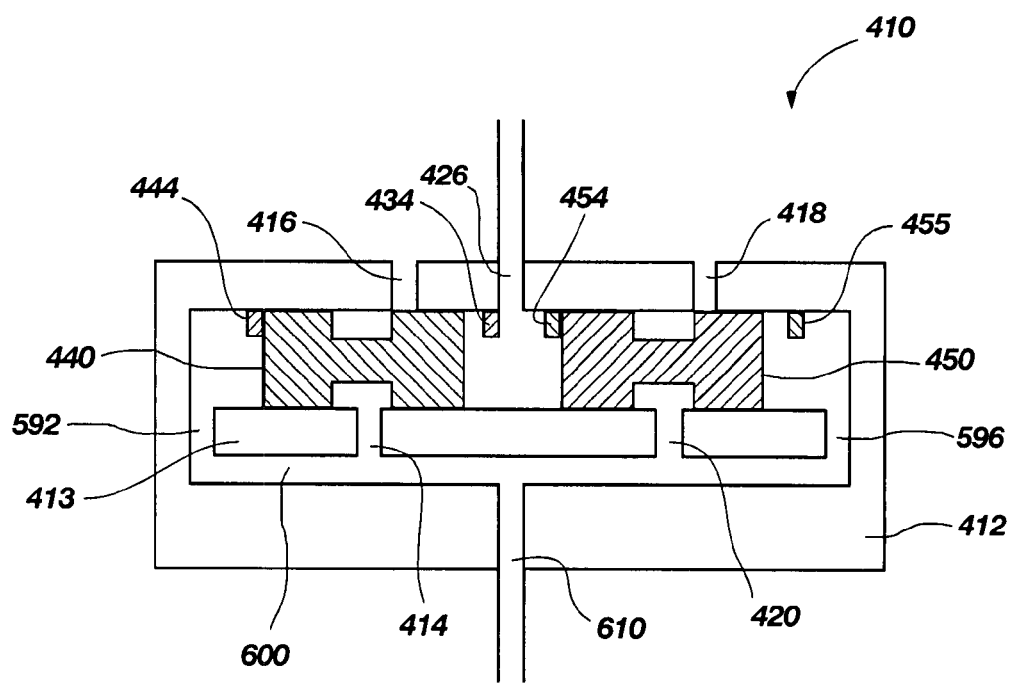
FIG. 8 illustrates a cut-away, cross-sectional view of a symmetrical pressure control valve according to still another exemplary embodiment of the present invention.

FIG. 8 illustrates still another exemplary embodiment of a PCV 410, which is similar to the PCV 10 described above, with some differences. In this particular embodiment, the PCV 410 comprises a valve body 412 having formed therein a return inlet port 414, a return outlet port 416, a pressure inlet port 418, a pressure outlet port 420, first and second feedback ports 592 and 596, a pilot pressure port 426, and a output/load pressure port 610. The PCV 410 further comprises dual independent spools, namely return spool 440 and pressure spool 450, commonly situated about a longitudinal axis of the valve body 412. Return and pressure spools 440 and 450 are freely disposed and supported within valve body 412 by a support member 413 configured to facilitate the displacement of the spools 440 and 450, and restricted in movement by one or more limiting means, such as spool stops 434, 444, 454, and 455. As can be seen, the main fluid line 600 is contained within the valve body 412 rather than being exterior to the valve body 412 as in the exemplary embodiment of FIG. 1. In addition, the first and second feedback ports 592 and 596 are each contained within the valve body 412.

Another difference in this particular embodiment from that of FIG. 1 is that the return inlet and outlet ports 414 and 416 are offset from one another. Also, the pressure inlet and outlet ports 418 and 420 are offset from one another. Although offset, the PCV 410 functions in a similar manner as the PCV 10 described above.

Still another difference is the existence of a fourth limiting means or spool stop 455 that limits the movement or displacement of spool 450.

In light of the foregoing, one skilled in the art can see how the present invention dual independent spool pressure control valve with its intrinsic feedback system and dynamic pressure regulation capabilities solves many of the problems found in classical or conventional servo systems.

Figure 9:
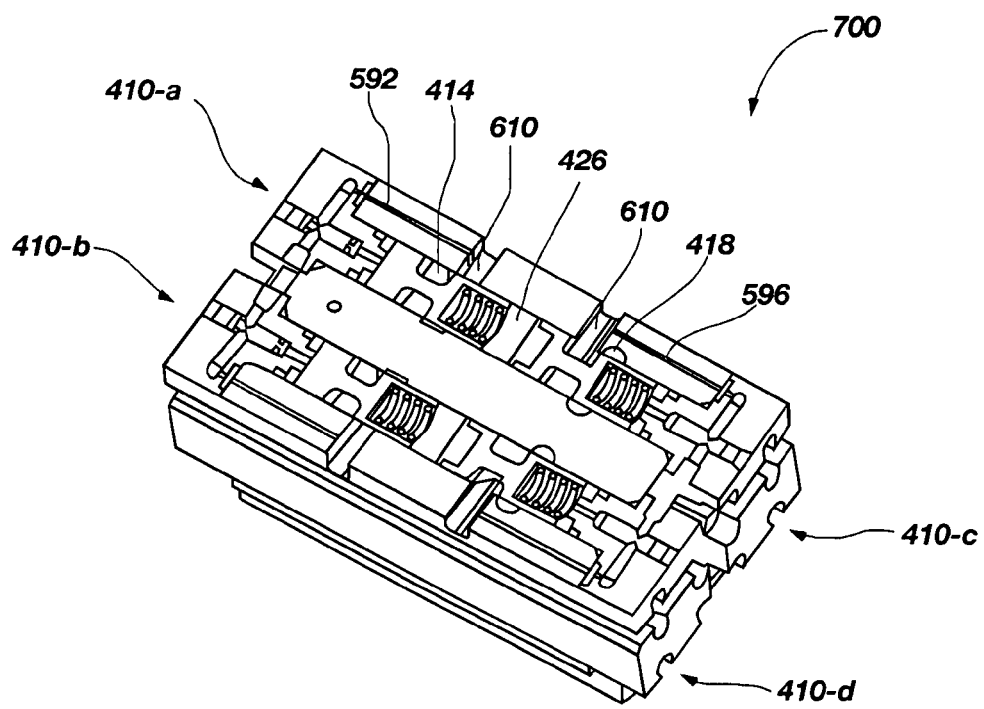
FIG. 9 illustrates a cut-away perspective view of a pressure control system comprising four pressure control valves as described and shown in FIG. 8.

With reference now to FIG. 9, illustrated is an exemplary application of the PCV 410 of FIG. 8. As shown, FIG. 9 illustrates a cut-away perspective view of a pressure control system 700 comprising a plurality of PCVs, namely four separate PCVs packed together, shown as PCV 410-$a$, 410-$b$, 410-$c$, and 410-$d$. The PCVs 410$a$-$d$ comprise all of the features and components as described above, some of which are shown as feedback pressure ports 592 and 596, pressure return and supply ports 414 and 418, respectively, output/load pressure ports 610, and pilot pressure port 426.

Figure 10:
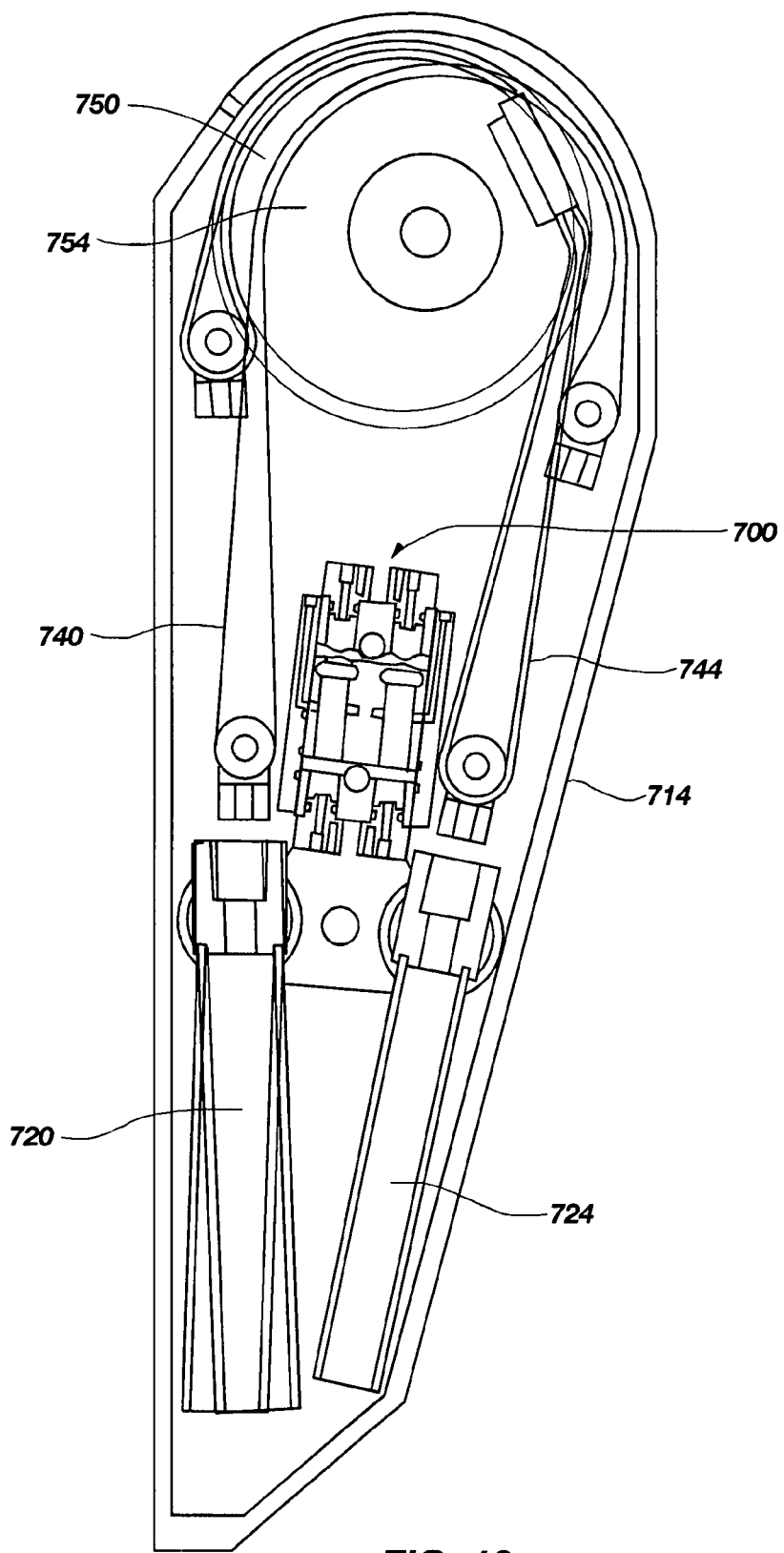
FIG. 10 illustrates a cut-away side view of an exemplary application, namely a portion of a leg of a powered exoskeleton, utilizing the pressure control system of FIG. 9.

FIG. 10 illustrates an exemplary application utilizing the pressure control system of FIG. 9. In this particular application, the pressure control system 700 is supported and operable within an exoskeleton (not shown in its entirety), and particularly the leg 714 of the exoskeleton. The pressure control system 700 is used to control one or more actuators, shown as actuators 720 and 724, each of which are coupled to a tendon drive system, respectively. Within the tendon drive system, tendons 740 and 744 are operably coupled to pulleys 750 and 754, respectively, at one end, and actuators 720 and 724, respectively, at an opposite end. The actuators 720 and 724 are fluidly coupled to the pressure control system 700, and more particularly to the individual pressure control valves contained therein via the output/load pressure ports. The pressure in the output/load pressure ports is used to drive the piston (not shown) within the cylinder of the actuators 720 and 724. Using pressure control from the pressure control system 700, the actuators 720 and 724 are selectively caused to actuate to drive the tendons 740 and 744 attached thereto to rotate pulleys 750 and 754, which functions to power the limb or leg 714 of the exoskeleton. Any one or all of the PCVs contained within the pressure control system 700 may be selectively activated to control the tendon drive system.

Figure 11:
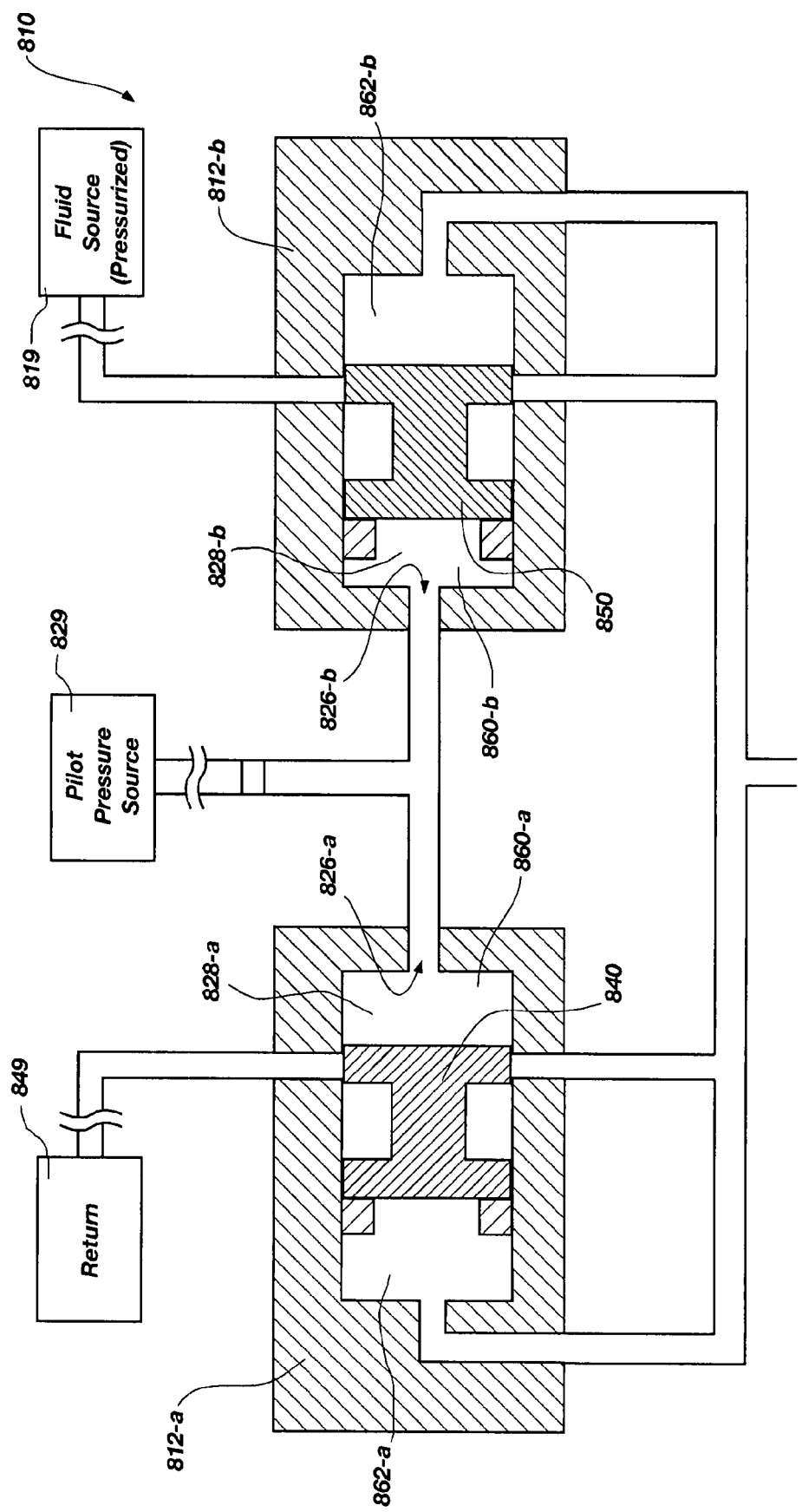
FIG. 11 illustrates a cut-away view of a pressure control valve in accordance with still another exemplary embodiment of the present invention.

FIG. 11 illustrates another exemplary embodiment of the present invention pressure control valve. In this particular embodiment, the PCV 810 comprises a valve body separated into a return valve body 812-$a$ and a pressure valve body 812-$b$, similar to the embodiment described above and shown in FIG. 7. However, unlike the embodiment of FIG. 7 in which the PCV valving components are contained within the same structure or housing, the return and pressure valve bodies 812-$a$ and 812-$b$ of the PCV 810 of FIG. 11 reside in separate and independent structures.

In this particular embodiment, return valve body 812-$a$ comprises an interior cavity 860-$a$, which is further divided into a pilot pressure chamber 828-$a$ and a feedback chamber 862-$a$ by the return spool 840, which is similar to the one shown in FIG. 1. Likewise, pressure valve body 812-$b$ comprises an interior cavity 860-$b$, which is further divided into a pilot pressure chamber 828-$b$ and a feedback chamber 862-$b$ by the pressure spool 850, again, which is similar to the one shown in FIG. 1. The pilot pressure chamber 828-$a$ is in fluid communication with pilot pressure port 826-$a$, and pilot pressure chamber 828-$b$ is in fluid communication with pilot pressure port 826-$b$. Each of the pilot pressure ports 826-$a$ and 826-$b$ are in fluid communication with one another, and with pilot pressure source 829 via the fluid line that connects each of these.

In operation, the pilot pressure from the pilot pressure source 829 functions as described above, only instead of the PCV comprising a single pilot pressure chamber with two spools defining the boundaries of the pilot pressure chamber, and instead of the pressurized fluid from the pilot pressure source being input into a single chamber, the PCV 810 comprises separate pilot pressure chambers 828-$a$ and 828-$b$ that each receive a pilot pressure from the pilot pressure source 829, which pilot pressure functions to manipulate the displacement of the spools 840 and 850, respectively, to return fluid to return 849, or to input fluid from pressurized fluid source 819 to control or respond to an actuator (not shown). The pilot pressures within each of the pilot pressure chambers 828-$a$ and 828-$b$ are intended to be introduced therein and function similarly as described above.

Other than the difference in configuration, wherein the interior cavities 860-$a$ and 860-$b$ (including pilot pressure chambers 828-$a$ and 828-$b$, and feedback chambers 862-$a$ and 862-$b$) of the return valve body 812-$a$ and the pressure valve body 812-$b$, respectively, are not integrally formed or contained within the same structure or housing, and as otherwise described herein, the PCV embodiment of FIG. 11 functions in substantially the same manner as the PCVs shown in FIGS. 1-4, and 7-8. As such, the description set forth above with respect to each of these embodiments may be incorporated into the description of PCV 810, where applicable and appropriate.

Assymetric Valving Configuration

The present invention contemplates a PCV having a different configuration than the symmetrical PCV configurations discussed above. Specifically, the present invention contemplates a PCV comprising a valve body having an asymmetric configuration with the interior cavity of a first valving component or valve body having a different size than the interior cavity of a second valving component or valve body. By different size it is intended that the interior of one valving component of the valve body housing and supporting a free floating spool be greater in size than the interior cavity of another valving component of the valve body housing and supporting a different free floating spool. Being greater in size is intended to mean a valving component having an interior cavity having a greater size as measured radially outward from a central or longitudinal axis of the valving component extending along the direction of travel of the spools contained therein. Stated differently, greater in size is intended to mean a valving component having an interior cavity having a greater or increased cross-sectional area. For example, a greater sized valving component will comprise an interior cavity having increased radius and/or diameter.

The asymmetric PCV typically comprises a return side that regulates return fluid, and a pressure side that regulates pressurized fluid. Each of these sides are representative of or may be expressed in terms of a return valving component or return valve body, and a pressure valving component or pressure valve body, respectively. It is further contemplated that either of the pressure or return sides of the PCV may be configured to comprise a greater size than the other.

Likewise, the asymmetric PCV comprises different sized free floating independent spools, with each sized valving component containing or supporting a spool having a corresponding size. Again, the size of the various spools is intended to be measured radially outward from a central or longitudinal axis of the spools (e.g., their radius or diameter).

Figure 12:
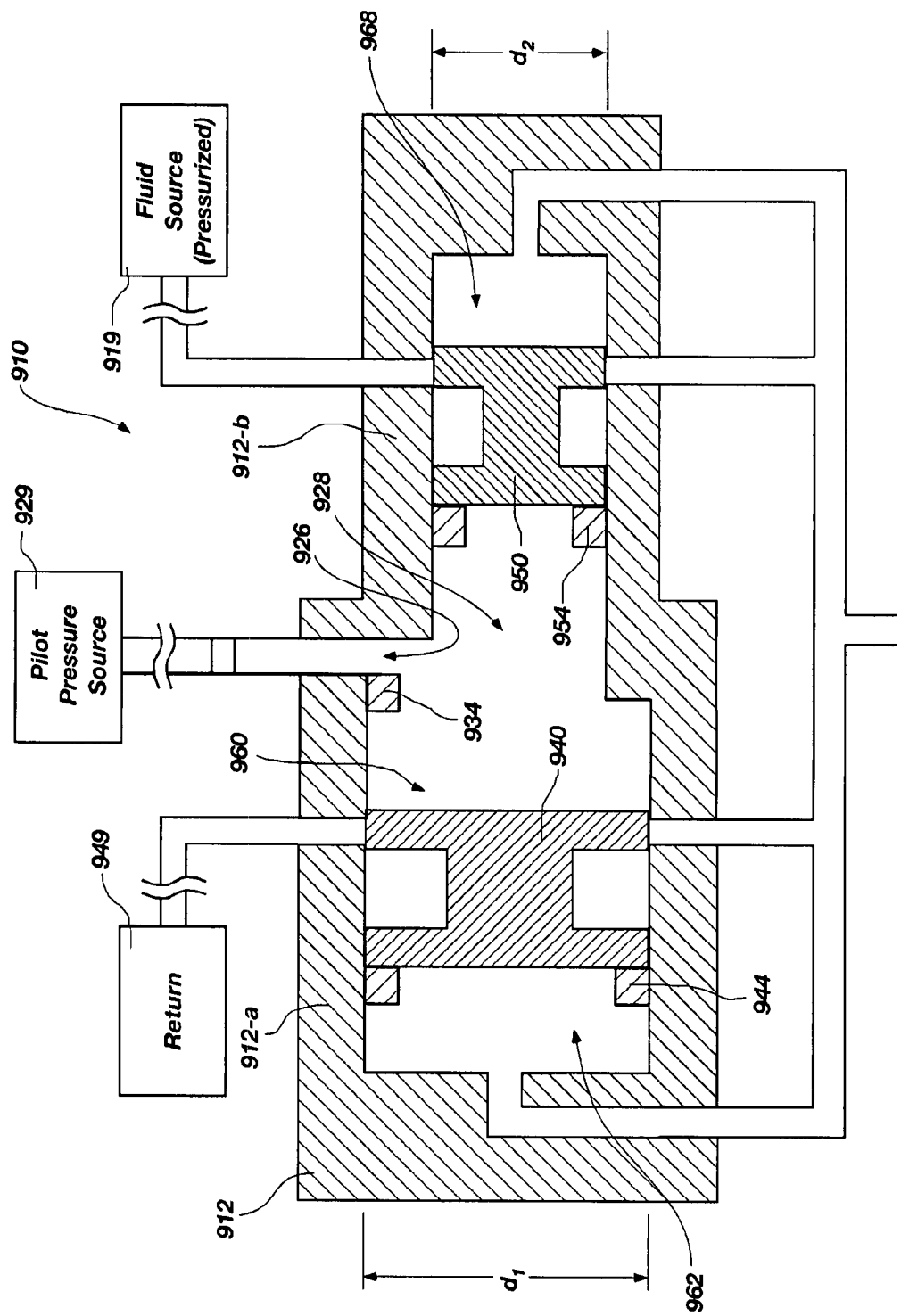
FIG. 12 illustrates a cut-away view of an asymmetric pressure control valve in accordance with an exemplary embodiment of the present invention.

With reference now to FIG. 12, illustrated is a PCV in accordance with another exemplary embodiment of the present invention. In this embodiment, the PCV 910 is similar in many respects to the PCV of FIG. 1, but comprises an asymmetric configuration with a valve body 912 comprising a return valving component or return side valve body 912-*a* having an increased or greater size than a pressure valving component or pressure side valve body 912-*b*. In addition, the return valving component or return valve body 912-*a* contains a free floating independent return spool 940 having a size corresponding to the larger sized return valving component or valve body 912-*a*, with the pressure valving component or valve body 912-*b* also containing a free floating independent pressure spool 950 corresponding to the size of the pressure valving component or valve body 912-*b*. Stated differently, the PCV 910 comprises an asymmetric valve body, which in this embodiment, illustrates components defining and making up and facilitating the control of return fluid being larger in size than the components defining and making up and facilitating the control of pressurized fluid. As shown, the valve body 912 comprises an interior cavity 960 having a circular cross-section. The return valving component or valve body 912-*a* and return spool 940 comprise essentially the same diameter $d_1$, which is shown as being greater than the diameter $d_2$ of the pressure valving component or valve body 912-*b* and its corresponding pressure spool 950.

Likewise, the PCV 910 comprises a return feedback chamber 962 adjacent the return spool 940, which chamber has an increased size and corresponding volume over the pressure feedback chamber 968 adjacent the pressure spool 950. The pilot pressure chamber 928 is configured to function in a similar way as described above, but is configured to operate with the asymmetric valving structure. The pilot pressure chamber 928 is in fluid communication with a pilot pressure source 929 through pilot pressure port 926 to thereby receive a pilot pressure that acts on each of the return spool 940 and the pressure spool 950, as taught above.

In the embodiment shown, the return spool 940 is caused to displace back and forth between spool stops 944 and 934. The spool stops may be separate structures or members from the valve body 912, or part of the valve body 912 may be sized and configured to function as a spool stop, such as the step up in the valve body occurring within the pilot pressure chamber 928, as shown, which step up coincides in position with the spool stop 934.

An asymmetric PCV functions similar to a symmetrical PCV in many respects, but with some significant differences. In addition, an asymmetrical PCV may provide many significant advantages over a symmetrical PCV in some operating conditions. As discussed above, the PCV, whether symmetrical or asymmetrical, is intended to be a pressure source. If the current (e.g., pilot or control pressure) in the pilot valve is set, a given pressure in the PCV is obtained regardless of the movement of the return and pressure spools therein. The pressure side, or rather the pressure valve body, of the PCV can be smaller in size than the return side, or return valve body, of the PCV since there is a relatively high amount of pressure in the pressure side, due to the pressure source (e.g., 3,500 psi), as compared to the relatively low amount of pressure (e.g., 200 psi) acting within the return side as fluid exits the PCV. The return side of the PCV may be larger in order to accommodate the lower pressures acting therein.

The pressure side of the PCV may be caused to be smaller in size than the return side of the PCV in order to eliminate or reduce the effects of many encountered problems. For example, utilizing a symmetrical PCV as opposed to an asymmetrical PCV with pressure and return sides different in size may, in some circumstances, cause the system, and particularly the actuator, to be overwhelmed as there may be too much high pressure fluid flowing through the PCV and into the system. Indeed, in some embodiments, or rather in some operating environments, a symmetrical PCV may be limited in its functional capacity in one or more ways. To illustrate, it has been discovered that for a certain pilot valve producing a certain range of pilot or control pressures, the size of a symmetrical PCV that it may operate with and control may be limited as the pilot valve typically is only able to operate or control so big a symmetrical PCV since the pilot valve must adequately source flow via the control or pilot pressure when the return and pressure spools displace due to movement in the actuator. Indeed, in some situations, the particular pilot valve utilized may dictate the size and configuration of the PCV. In these cases, it may be desirable to operate a pilot valve in conjunction with an asymmetric PCV, such as the one shown in FIG. 12.

Employing an asymmetrical PCV may resolve some of the constraints imposed by a symmetrical PCV by allowing the return side of increased size to accommodate the fluid in the system, thus keeping it stable. As compared to the symmetrical PCVs discussed above, providing different sized or asymmetric pressure and return valving structures within a PCV enables the pilot source supplying the pilot or control pressure to better source flow through the system and the PCV, and to account or accommodate the different pressures acting within the pressure and return sides of the PCV. In addition, increasing the size of the return side with respect to the pressure side may help to reduce the amount of leakage within the system.

The size differential between the return and pressure sides of an asymmetrical PCV may vary as needed between PCV designs. One skilled in the art may determine a desired or needed differential based on any number of factors, such as required or desired operating parameters, operating conditions, system constraints, environmental considerations, efficiency, cost, etc.

Figure 13:
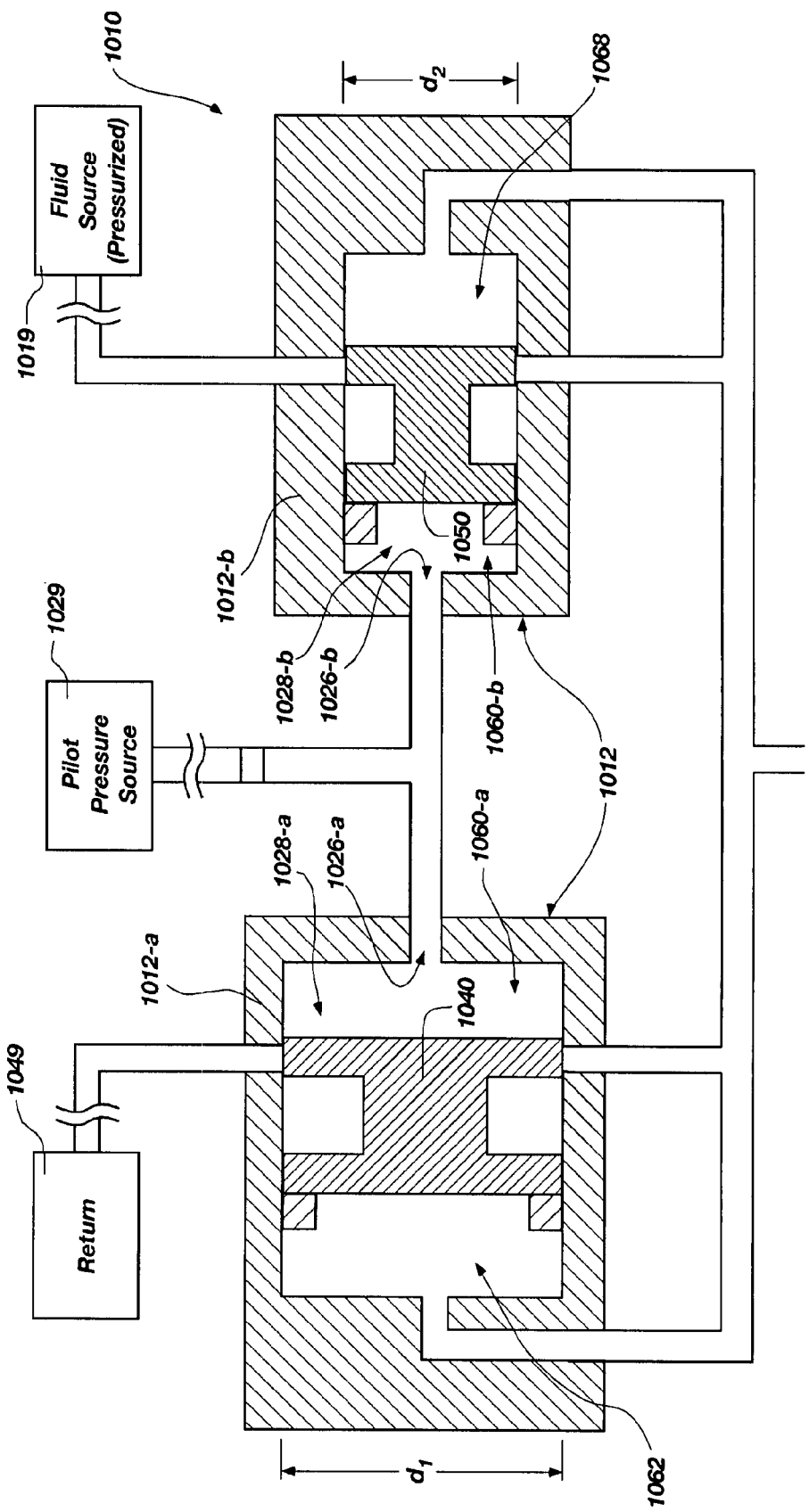
FIG. 13 illustrates a cut-away view of an asymmetric pressure control valve in accordance with another exemplary embodiment of the present invention.

In another embodiment, and much like the embodiments in either of FIGS. 7 and 11, an asymmetrical PCV may comprise two valving structures or components (e.g., valving structures or components that are not collinear or coaxial with one another (such as shown in FIG. 7), or that are independent of one another (such as shown in FIG. 11)), namely a pressure component and a return component, wherein the return component or return side comprises a greater size than the pressure component or pressure side for the same reasons discussed above. Although independent of or not coaxial with one another, and although asymmetric, the pressure component and the return component are each intended to be in fluid communication with the pilot valve to receive a pilot or control pressure as taught herein. FIG. 13 illustrates an asymmetrical PCV in accordance with one exemplary embodiment, where the return component or side is independent of the pressure component or side. As shown, the PCV 1010 comprises a valve body 1012 having a return component or a return valve body 1012-*a* and a pressure component or a pressure valve body 1012-*b*. The return valve body 1012-*a* is larger in size than the pressure valve body 1012-*b*, with the return valve body 1012-*a* comprising a diameter $d_1$ that is larger than the diameter $d_2$ of the pressure valve body 1012-*b*, similar to the asymmetric configuration shown in FIG. 12. In addition, the PCV 1010 comprises a return spool 1040 having an increased size that corresponds to the increased size of the return valve body 1012-*a*, as compared to a pressure spool 1050 within the pressure valve body 1012-*b*.

In this particular embodiment, return valve body 1012-*a* comprises an interior cavity 1060-*a*, which is further divided into a pilot pressure chamber 1028-*a* and a feedback chamber 1062 by the return spool 1040, which is similar to the one shown in FIG. 11. Likewise, pressure valve body 1012-*b* comprises an interior cavity 1060-*b*, which is further divided into a pilot pressure chamber 1028-*b* and a feedback chamber 1068 by the pressure spool 1050, again, which is similar to the one shown in FIG. 11. The pilot pressure chamber 1028-*a* is in fluid communication with pilot pressure port 1026-*a*, and pilot pressure chamber 1028-*b* is in fluid communication with pilot pressure port 1026-*b*. Each of the pilot pressure ports 1026-*a* and 1026-*b* are in fluid communication with one another, and with pilot pressure source 1029 via the fluid line that connects each of these.

In operation, the pilot pressure from the pilot pressure source 1029 functions as described above, only instead of the PCV comprising a single pilot pressure chamber with two spools defining the boundaries of the pilot pressure chamber, and instead of the pressurized fluid from the pilot pressure source being input into a single chamber, the PCV 1010 comprises separate pilot pressure chambers 1028-*a* and 1028-*b* that each receive a pilot pressure from the pilot pressure source 1029, which pilot pressure functions to manipulate the displacement of the spools 1040 and 1050, respectively, to return fluid to return 1029, or to input fluid from pressurized fluid source 1019 to control or respond to an actuator (not shown). The pilot pressures within each of the pilot pressure chambers 1028-*a* and 1028-*b* are intended to be introduced therein and function similarly as described above.

It is noted that the PCVs of FIGS. 12 and 13 function in substantially the same manner as at least one of the PCVs shown in FIGS. 1-4, and 7-9. Indeed, many of the various components and the specific function of the asymmetric PCV 910 and the asymmetric PCV 1010 are not set forth in detail herein as it is anticipated that the description set forth above with respect to one of the PCV embodiments of FIGS. 1-4 and 7-9 may be incorporated into the description of asymmetric PCV 910 and PCV 1010, where applicable and appropriate.

Although not specifically set forth and described herein, it is also noted that the asymmetric PCVs shown in FIGS. 12 and 13 may incorporate an intrinsic mechanical feedback system such as the ones set forth in U.S. patent application Ser. No. 11/293,726, filed Dec. 1, 2005, and entitled, "Pressure Control Valve Having Intrinsic Mechanical Feedback System," which is incorporated by reference herein. It will be apparent to one skilled in the art, upon reading this disclosure and that of the above-incorporated application, how to modify the asymmetric PCVs of the present invention with a mechanical feedback system.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not expressly recited, except in the specification. Accordingly, the scope of the invention should be determined solely by the appended claims and their legal equivalents, rather than by the descriptions and examples given above.

The invention claimed is:

1. An asymmetric pressure control valve for regulating pressure within a servo system comprising:

a valve body having an asymmetric configuration, such that a return valving component of said valve body comprises a greater size than a pressure valving component of said valve body, said valve body having return and pressure inlet and outlet ports formed therein for fluidly communicating with an interior cavity of said valve body;

a return spool freely supported within an interior cavity of said return valving component of said valve body and configured to regulate fluid flow through said return inlet and outlet ports; and a pressure spool, independent of said return spool, and freely supported within an interior cavity of said pressure valving component of said valve body, said pressure spool configured to regulate fluid flow through said pressure inlet and outlet ports, said return spool being greater in size than said pressure spool and corresponding in size to said return valving component, said pressure spool corresponding in size to said pressure valving component.

2. The asymmetric pressure control valve of claim 1, further comprising an intrinsic pressure feedback system configured to displace said return and pressure spools in response to a pressure differential created between a pilot pressure and a feedback pressure concurrently acting on said return and pressure spools, said intrinsic pressure feedback system functioning to dissipate said pressure differential in an attempt to equalize said pilot pressure and said feedback pressure.

3. The asymmetric pressure control valve of claim 1, further comprising limiting means located within said valve body configured to establish limiting positions of said return and pressure spools within said return and pressure valving components, respectively, of said valve body.

4. The asymmetric pressure control valve of claim 1, wherein a part of said valve body forms a limiting means for said return spool, which limiting means establishes a limiting position of said return spool within said return valving component.

5. The asymmetric pressure control valve of claim 2, further comprising a pilot pressure chamber adjacent said return and pressure spools, and in fluid communication with a pilot pressure source that functions to introduce a pilot pressure into said pilot pressure chamber through a pilot pressure port formed in said valve body, said pilot pressure and said feedback pressure acting on said return and pressure spools.

6. The asymmetric pressure control valve of claim 1, wherein said pressure valving component and said return valving component of said valve body are physically separate structures, not being integrally formed with one another, each of said pressure and return valving components having a pilot pressure chamber in fluid communication with one another, and a feedback system in fluid communication with one another.

7. The asymmetric pressure control valve of claim 1, wherein said return and pressure spools comprise a geometric size and configuration that substantially conforms to a geometric size and configuration of an inside cavity of said return and pressure valving components, respectively, of said valve body.

8. The asymmetric pressure control valve of claim 1, further comprising a main fluid line in fluid communication with said return inlet port and said pressure outlet port, as well as first and second feedback ports, said main fluid line configured to fluidly connect a load actuator to said asymmetric pressure control valve through a load feed line.

9. The asymmetric pressure control valve of claim 2, further comprising a pressure purging mode defined by a pressure differential condition in said asymmetric pressure control valve where a pilot pressure is less than a feedback pressure, thus causing said return spool to displace and open said return inlet and outlet ports to purge pressure from said servo system and dissipate said pressure differential.

10. The asymmetric pressure control valve of claim 1, further comprising an actuating mode defined by a pressure differential condition in said asymmetric pressure control valve where a pilot pressure exceeds a feedback pressure, thus causing said pressure spool to displace and open said pressure inlet and outlet ports to allow pressurized fluid from a pressurized fluid source to enter to dissipate said pressure differential, thus increasing the pressure within said servo system to effectuate work.

11. The asymmetric pressure control valve of claim 1, further comprising a slosh mode defined by a pressure differential condition in said asymmetric pressure control valve where a pilot pressure is maintained below a feedback pressure, thus causing said return spool to displace and open said return inlet and outlet ports to allow fluid to shunt back and forth in a low energy state.

12. The pressure control valve of claim 1, wherein said valve body comprises a non-linear configuration, with said return valving component being offset from said pressure valving component.

13. The pressure control valve of claim 2, wherein said return and pressure spools each comprise a pilot pressure side and a feedback pressure side, wherein said pilot pressure sides fluidly communicate with and are configured to receive said pilot pressure, and said feedback pressure sides fluidly communicate with and are configured to receive said feedback pressure.

14. The pressure control valve of claim 5, wherein said pilot pressure source comprises a mechanical pressure source.

15. The pressure control valve of claim 1, wherein said pilot pressure functions as a pilot pressure to create said pressure differential.

16. The pressure control valve of claim 2, wherein said pilot pressure may be varied as needed to control and manipulate the state of said pressure control valve and its operation.

17. An asymmetric pressure control valve for regulating pressure within a servo system comprising:
 a valve body having an asymmetric configuration, comprising:
  first and second valving components, said first valving component comprising a greater size than said second valving component;
  various inlet and outlet ports formed in said valving components for fluidly communicating with an interior cavity of said valve body;
 a first spool freely supported within one of said first and second valving components of said valve body and configured to regulate fluid flow through select said inlet and outlet ports formed in said valve body; and
 a second spool, independent of said first spool, freely supported within the other of said first and second valving components of said valve body not supporting said first spool, said second spool configured to regulate fluid flow through select said inlet and outlet ports formed in said valve body,
 said first and second spools being different in size and each corresponding in size to their respective supportive valving components.

18. An asymmetric pressure control valve comprising:
 a floating return spool configured to freely move within a return valving component of a valve body;
 a floating pressure spool configured to freely move within a pressure valving component of said valve body, said return spool having a greater size than said pressure spool, and said return valving component having a greater size than said pressure valving component;
 said floating return and pressure spools structurally independent of one another and said valve body, said pressure control valve configured to regulate pressure via an intrinsic feedback system configured to intrinsically and systematically displace at least one of said return and pressure spools in response to a pressure differential existing between a pilot pressure and a feedback pressure acting on opposing sides of each of said return and pressure spools, in an attempt to dissipate said pressure differential and equalize said pilot pressure and said feedback pressure.

19. The pressure control valve of claim 18, wherein said pilot pressure is supplied by a variable pilot pressure source in fluid communication with said floating return and pressure spools via a pilot pressure port formed within said valve body, said pilot pressure regulated by a pilot valve configured to control said pilot pressure acting on said floating return and pressure spools, said pilot pressure being varied to selectively create and control said pressure differential.

20. The pressure control valve of claim 18, wherein said feedback pressure is supplied by a variable load pressure in fluid communication with said floating return and pressure spools via a feedback port formed within said valving components of said valve body, said load pressure being varied to selectively create and control said pressure differential.

21. The pressure control valve of claim 18, wherein said intrinsic feedback system comprises:
 first and second feedback chambers in fluid connection with respective feedback pressure sides of said floating return and pressure spools;

first and second feedback ports formed within said return and pressure valving components and in fluid communication with said first and second feedback chambers, respectively, as well as with first and second feedback lines, respectively;

a main fluid line in fluid communication with said first and second feedback lines;

a load feed line in fluid communication with said main fluid line and a load energy conversion system configured to convert a force from a load into a load pressure that dictates said feedback pressure acting on said feedback pressure sides of said floating return and pressure spools;

a pilot chamber in fluid communication with respective pilot pressure sides of said floating return and pressure spools; and a pilot port formed in said valve body and in fluid communication with a pilot pressure source configured to supply said pilot pressure to said pilot chamber.

22. The pressure control valve of claim 18, wherein said return spool displaces when said pressure differential is such that said feedback pressure exceeds and overcomes said pilot pressure.

23. The pressure control valve of claim 18, wherein said pressure spool displaces when said pressure differential is such that said pilot pressure exceeds and overcomes said feedback pressure.

24. An asymmetric pressure control valve comprising:

a valve body having pressure and return inlet and outlet ports formed therein, said valve body comprising:

a return valving component having an interior cavity, and a pressure valving component having an interior cavity, said interior cavity of said return valving component having a larger cross-sectional area than said interior cavity of said pressure valving component;

a return spool disposed within said interior cavity of said return valving component and configured to regulate fluid flow through said return inlet and outlet ports, said return spool having a pilot pressure side and a load feedback pressure side;

a pressure spool disposed within said interior cavity of said pressure valving component opposite and independent of said return spool, said return spool comprising a larger radial size than said pressure spool, said pressure spool configured to regulate fluid flow through said pressure inlet and outlet ports, said pressure spool also having a pilot pressure side and a load feedback pressure side; and limiting means located within said return and pressure valving components configured to establish limiting positions of said return and pressure spools, said return and pressure spools capable of being displaced to intrinsically and systematically open and close said return and pressure inlet and outlet ports in response to a pressure differential created between a pilot pressure and a feedback pressure concurrently acting on said pilot pressure and load pressure sides, respectively, of said return and pressure spools for the purpose of dissipating said pressure differential.

25. An asymmetric pressure control valve, comprising:

a valve body having pressure inlet and outlet ports and return inlet and outlet ports formed therein, said valve body comprising:

a return valving component having an interior cavity, and a pressure valving component having an interior cavity, said interior cavity of said return valving component having a greater cross-sectional area than said interior cavity of said pressure valving component;

a return spool configured to regulate fluid flow through said return inlet and outlet ports, said return spool having a pilot pressure side and a feedback pressure side;

a pressure spool independent of said return spool, and comprising a smaller cross-sectional area than said return spool, which said smaller cross-sectional area corresponds to said pressure valving component, said pressure spool configured to regulate fluid flow through said pressure inlet and outlet ports, said pressure spool also having a pilot pressure side and a load feedback pressure side;

a pilot pressure chamber confined between and defined by said pilot pressure sides of said return and pressure spools, said pilot pressure chamber in fluid communication with a pilot pressure source configured to provide a variable pilot pressure within said pilot pressure chamber to act on said pilot pressure sides of said return and pressure spools;

a feedback port formed in said valve body and in fluid communication with said feedback pressure side of said return spool;

a feedback port formed in said valve body and in fluid communication with said feedback pressure side of said pressure spool;

a main fluid line in fluid communication with said return and pressure outlet ports and said feedback ports;

a load feed line in fluid communication with said main fluid line and a load energy conversion system, said load energy conversion system comprising a variable load pressure therein configured to exert a variable feedback pressure on said feedback pressure sides of said return and pressure spools, wherein said feedback pressure may be different than said pilot pressure, thus creating a pressure differential causing said return and pressure spools to displace to selectively open said pressure and return inlet and outlet ports to dissipate said pressure differential for the purpose of balancing said pilot and load pressures;

a return spool stop coupled to said return valving component of said valve body and positioned on said feedback pressure side of said return spool, said return spool stop configured to limit the displacement position of said return spool so that said return inlet and outlet ports are at least partially closed when said pilot pressure is greater than said feedback pressure; and a pressure spool stop coupled to said pressure valving component of said valve body and positioned on said pilot pressure side of said pressure spool, said pressure spool stop configured to limit the displacement position of said pressure spool so that said pressure inlet and outlet ports are at least partially closed when said pilot pressure is less than said feedback pressure.

26. A method for regulating and controlling pressure within a servo-type system, said method comprising:

providing an asymmetric pressure control valve comprising an asymmetric valve body, wherein a return valving component is sized differently than a pressure valving component, said pressure control valve also comprising differently sized independent return and pressure spools freely situated in said valve body, said return and pressure spools each comprising a pilot pressure side and a feedback pressure side and each configured to regulate fluid flow through return and pressure inlet and outlet ports formed in said valve body, respectively;

supplying a pilot pressure to said respective pilot pressure sides of said return and pressure spools;

supplying a feedback pressure to said respective feedback pressure sides of said return and pressure spools; and inducing a pressure differential across said pilot pressure and feedback pressure sides of said return and pressure spools, thus causing at least one of said return and pressure spools to displace in response to said pressure differential in an attempt to dissipate said pressure differential and equalize said pilot pressure and said feedback pressure.

27. The method of claim 26, wherein said inducing comprises manipulating said pilot pressure to exceed said feedback pressure, thus causing said pressure spool to open said pressure inlet and outlet ports to input pressurized fluid in an attempt to equalize said pilot pressure and said feedback pressure.

28. The method of claim 26, wherein said inducing comprises manipulating said pilot pressure to be less than said feedback pressure, thus causing said return spool to displace to open said return inlet and outlet ports to purge pressurized fluid in an attempt to equalize said pilot pressure and said feedback pressure.

29. The method of claim 26, further comprising holding said pilot pressure below said feedback pressure, thus causing said return spool to open said return inlet and outlet ports, to allow said pressure control valve to enter a low energy slosh mode configured to allow fluid to shunt back and forth through said return inlet and outlet ports for the purpose of allowing an actuatable load fluidly coupled to the pressure control valve to free swing.

30. A method for introducing passive actuation within a servo or servo-type system comprising:

providing a load actuator coupled to a load and configured to convert back and forth a load pressure and a force;

providing an asymmetric pressure control valve in fluid communication with said load actuator, said pressure control valve comprising an asymmetric valve body having different sized valving components, and different sized independent return and pressure spools freely situated in said different sized valving components, respectively, said return and pressure spools each comprising a pilot pressure side and a feedback side and each configured to regulate fluid flow through return and pressure inlet and outlet ports formed in said valve body, respectively, in accordance with an intrinsic mechanical feedback system;

supplying a pilot pressure to said respective pilot pressure sides of said return and pressure spools;

supplying a feedback pressure to said respective feedback sides of said return and pressure spools, said feedback pressure corresponding to said load pressure provided by said load actuator; and manipulating said pilot pressure to be below said feedback pressure to cause said pressure control valve to enter a passive actuation or slosh mode, wherein said pressure spool is closed and said return spool is open, thus allowing fluid to directly shunt back and forth between said pressure control valve and said load actuator through said return inlet and outlet ports.

31. The method of claim 30, further comprising maintaining said pilot pressure to be below said feedback pressure for a pre-determined period of time to maintain said pressure control valve in said slosh mode.

* * * * *